United States Patent
Okazaki et al.

(10) Patent No.: US 9,273,222 B2
(45) Date of Patent: Mar. 1, 2016

(54) COMPOSITION AND FILM COMPRISING SAME

(71) Applicant: Mitsui Chemicals, Inc., Tokyo (JP)

(72) Inventors: Koju Okazaki, Ichihara (JP); Noboru Kawasaki, Sakura (JP); Kenichi Fujii, Yokohama (JP)

(73) Assignee: MITSUI CHEMICALS, INC., Tokyo (JP)

(*) Notice: Subject to any disclaimer, the term of this patent is extended or adjusted under 35 U.S.C. 154(b) by 0 days.

(21) Appl. No.: 14/350,768

(22) PCT Filed: Oct. 12, 2012

(86) PCT No.: PCT/JP2012/076425
§ 371 (c)(1),
(2) Date: Apr. 9, 2014

(87) PCT Pub. No.: WO2013/054877
PCT Pub. Date: Apr. 18, 2013

(65) Prior Publication Data
US 2014/0256870 A1    Sep. 11, 2014

(30) Foreign Application Priority Data

Oct. 14, 2011 (JP) .................. 2011-226450

(51) Int. Cl.
C09D 163/00 (2006.01)
C09D 133/14 (2006.01)
C08G 59/32 (2006.01)
C09D 133/26 (2006.01)

(52) U.S. Cl.
CPC .............. *C09D 133/14* (2013.01); *C08G 59/32* (2013.01); *C09D 133/26* (2013.01); *C09D 163/00* (2013.01)

(58) Field of Classification Search
None
See application file for complete search history.

(56) References Cited

U.S. PATENT DOCUMENTS 3,872,047 A * 3/1975 Jandourek .................. 523/115
4,274,933 A * 6/1981 Kamada et al. ............ 522/171
(Continued)

FOREIGN PATENT DOCUMENTS

CN 1923867 A 3/2007
CN 102051146 A 5/2011
(Continued)

OTHER PUBLICATIONS

Machine translation of JP-08003281, 8 pages, translation generated on Dec. 2014.*
(Continued)

*Primary Examiner* — Robert S Loewe
(74) *Attorney, Agent, or Firm* — Foley & Lardner LLP

(57) ABSTRACT

The present invention provides: a composition including a polymer (i) which has a —SO$_3$M group and an epoxy group, wherein M represents a hydrogen atom, an alkali metal, an alkaline earth metal or an ammonium ion, and a silane compound (ii) which has at least two hydroxy group(s), alkoxy group(s) or halogen atom(s) that are each bound to a silane atom; and a hydrophilic film obtained by curing the composition. The hydrophilic film of the present invention is excellent in its hydrophilicity, durability, abrasion resistance and weather resistance and has high antifogging, antifouling, antistatic and quick-drying (water evaporation) properties. Therefore, a variety of laminates in which the hydrophilic film of the present invention is laminated on a substrate can also be provided.

8 Claims, 5 Drawing Sheets

(56) References Cited

U.S. PATENT DOCUMENTS

| | | | |
|---|---|---|---|
| 4,600,521 A * | 7/1986 | Nakamura et al. | 252/62.54 |
| 5,273,812 A * | 12/1993 | Oguchi et al. | 428/220 |
| 5,330,885 A * | 7/1994 | Takamuki et al. | 430/523 |
| 8,617,711 B2 | 12/2013 | Okazaki et al. | |
| 2004/0185375 A1* | 9/2004 | Takahashi et al. | 430/300 |
| 2006/0165934 A1* | 7/2006 | Okazaki et al. | 428/40.1 |
| 2011/0008630 A1* | 1/2011 | Okazaki et al. | 428/447 |
| 2011/0098433 A1* | 4/2011 | Lee et al. | 526/243 |
| 2012/0009379 A1* | 1/2012 | M ller et al. | 428/96 |
| 2012/0122694 A1* | 5/2012 | Last et al. | 504/359 |

FOREIGN PATENT DOCUMENTS

| | | |
|---|---|---|
| JP | 56-022365 A | 3/1981 |
| JP | 61-166824 A | 7/1986 |
| JP | 03-134002 A | 6/1991 |
| JP | 06-166847 A | 6/1994 |
| JP | 08-003281 A | 1/1996 |
| JP | 11-021512 A | 1/1999 |
| JP | 2006-089589 A | 4/2006 |
| JP | 2006-342221 A | 12/2006 |
| WO | WO-2007/064003 A1 | 6/2007 |

OTHER PUBLICATIONS

Machine translation of JP-2006342221, 23 pages, translation generated on Dec. 2014.*

Hase, Kaname, "Chapter 12: Surface-Treatment Technique," Technology and Application of Plastic Lens System, Jun. 30, 2003, pp. 165-166.

International Search Report dated Nov. 6, 2012 issued in International Application No. PCT/JP2012/076425.

Trend, Annual Research Report by Toagosei Co., Ltd. Feb. 1999, pp. 39-44.

Tsukiyama, Fumitoshi, "Waterborne Architectural Stain-Resistance Paints," Kobunshi High Polymers, Japan, vol. 44(5), May 1995, pp. 307.

Zairyou, Mirai, Expected Materials for the Future, vol. 2(1), 2002, pp. 36-41.

* cited by examiner

COMPOSITION AND FILM COMPRISING SAME

CROSS-REFERENCE TO RELATED APPLICATIONS

This application is the National Phase of PCT/JP2012/076425, filed Oct. 12, 2012, which claims priority to Japanese Application No. 2011-226450, filed Oct. 14, 2011, the disclosures of which are hereby incorporated by reference in their entirety.

TECHNICAL FIELD

The present invention relates to a hydrophilic film having antifogging, antifouling and antistatic properties as well as excellent abrasion resistance and weather resistance; a polymerizable composition for obtaining the hydrophilic film; and use thereof.

BACKGROUND ART

In recent years, there has been an increasing demand for improvement against fogging and fouling that occur on substrate surfaces such as plastic surface and glass surface.

As a method for solving this problem of fogging, an antifogging coating material prepared by adding a reactive surfactant to an acrylic oligomer has been proposed and a cured film obtained from this antifogging coating material is described to have improved hydrophilicity and water absorption properties (Non-Patent Document 1). In addition, for example, as a method for solving the problem of fouling, antifouling materials having self-cleaning properties (antifouling properties) that improve the surface hydrophilicity and allow dirt (hydrophobic substance in ambient air, etc.) adhered to an external wall or the like to come off and be efficiently removed with rainfall, sprinkled water or the like have been attracting attention (Non-patent Documents 2 and 3).

As a means of completely overcoming these problems of "fogging" and "fouling", the present inventors proposed a monolayer film in which anionic hydrophilic groups are biased (concentrated) to the surface (Patent Document 1). The hydrophilic film obtained by the invention is transparent and extremely highly hydrophilic and has excellent antifogging, antifouling, antistatic and quick-drying (high drying rate of adhered water) properties as well as excellent chemical resistance. Besides, this hydrophilic film is hard and also has excellent scratch resistance. However, investigations by the present inventors revealed that the hydrophilic film is not satisfactory in terms of abrasion resistance and weather resistance.

Generally, as a method for attaining excellent weather resistance and improving the abrasion resistance of a surface, a method of coating an inorganic compound is known. Representative examples of the use of such a method include a case where a silica compound prepared by sol-gel reaction is used as a hard coat of a spectacle lens (Non-patent Document 4).

A silica coating has a dense structure; therefore, it is extremely hard and its abrasion resistance reaches a level that is comparable to that of glass. However, at the same time, there are also problems, for example, that it is readily cracked and cannot be stained and that it readily allows dirt to adhere and to be fixed thereon. As a method of solving these problems, a variety of proposals have been made. For example, as a method of imparting staining property and toughness, a method of incorporating a melamine-polyhydric alcohol condensate and an epoxy group-containing silane compound into silica (Patent Document 2), a method of incorporating an epoxy compound and an aluminum complex into silica (Patent Document 3) and a method of incorporating a hydroxy group-containing acrylic polymer into silica (Patent Document 4) have been proposed.

As a method of imparting antifogging property by hydrophilization, a method of incorporating a styrene-based sulfonic acid polymer into silica has been proposed (Patent Document 5).

CITATION LIST

Patent Documents

[Patent Document 1] WO 2007/064003
[Patent Document 2] Japanese Laid-open Patent Application (Kokai) No. S56-22365
[Patent Document 3] Japanese Laid-open Patent Application (Kokai) No. S61-166824
[Patent Document 4] Japanese Laid-open Patent Application (Kokai) No. H06-166847
[Patent Document 5] Japanese Laid-open Patent Application (Kokai) No. H11-021512

Non-Patent Documents

[Non-patent Document 1] Toagosei Annual Research Report, TREND 1999, February, p. 39-44
[Non-patent Document 2] Polymer, 44(5), p. 307, 1995
[Non-patent Document 3] Expected Materials for the Future, 2(1), p. 36-41, 2002
[Non-patent Document 4] Technology and Application of Plastic Lens System, p. 165-166, CMC Publishing Co., Ltd., published on Jun. 30, 2003

SUMMARY OF THE INVENTION

Problems to be Solved by the Invention

The above-described proposal of Patent Document 5 is likely to improve the hydrophilicity and is thus preferred; however, the polymer easily dissociates from the resulting film and the hydrophilicity tends to be reduced by water. Particularly, these problems are more conspicuous as the film thickness increases and investigations by the present inventors have revealed that the film has a problem that it cannot withstand use in such a situation where antifogging and antifouling properties (self-cleaning by rainwater and the like) are actually required. An object of the present invention is to provide a hydrophilic film having an excellent balance of hydrophilicity and abrasion resistance as well as excellent weather resistance, in which film a reduction in the hydrophilicity caused by water is small.

Means for Solving the Problems

The present inventors have intensively studied to solve the above-described problems and discovered that a cured film which is obtained by allowing a polymer having an epoxy group reactive with silanol and a hydrophilic sulfonic acid group to react with a silane compound by sol-gel reaction can provide a hydrophilic film having an excellent balance of hydrophilicity and abrasion resistance as well as excellent weather resistance, in which film a reduction in the hydrophilicity caused by water is small.

That is, the present invention relates to the following [1] to [14].

[1] A composition, comprising:
a polymer (i) which has a —SO₃M group and an epoxy group, wherein M represents a hydrogen atom, an alkali metal, an alkaline earth metal or an ammonium ion; and
a silane compound (ii) which has a total of two or more groups or atoms that are selected from the group consisting of a hydroxy group bound to a silane atom, an alkoxy group bound to a silane atom and a halogen atom bound to a silane atom.

[2] The composition according to [1], wherein the above-described polymer (i) is a polymer comprising a structural unit represented by the following Formula (1) and a structural unit represented by the following Formula (2):

[Chem. 1]

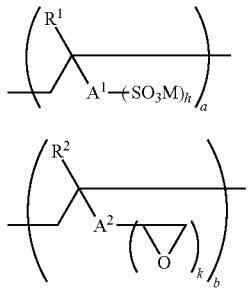

(wherein, in the Formulae (1) and (2),
R¹ and R² independently represent a hydrogen atom or a methyl group;
M represents a hydrogen atom, an alkali metal, an alkaline earth metal or an ammonium ion;
the unit ratio, a/b, is 1,000/1 to 1/1,000;
A¹ is represented by (Q1)$_f$(P1);
Q1 is selected from —COO—, —CONH— and a phenylene group which optionally has a substituent;
P1 is selected from the group consisting of a single bond and a divalent or higher valent hydrocarbon group having an ether structure and 1 to 15 carbon atoms;
f is 0 or 1 and h is 1 to 5;
A² is represented by (Q2)$_g$(P2);
Q2 is selected from —COO—, a divalent or higher valent hydrocarbon group having 1 to 5 carbon atoms, a phenylene group which optionally has a substituent, and —O—;
P2 is selected from the group consisting of a single bond, —X-P3-, -P4-Y— and -P5-;
P3 to P5 each independently represent a divalent or higher valent hydrocarbon group having an ether structure and 1 to 15 carbon atoms;
X represents oxygen, sulfur or —COO—;
Y represents oxygen or sulfur;
g is 0 or 1 and k is 1 to 5; and,
when g is 1 and Q2 is —O— or —COO—, P2 is not —X-P3-).

[3] The composition according to [2], wherein,
in the above-described Formula (1), A¹ represents a single bond, —CH₂—, —C₆H₄—, —COOCH₂—, —COOCH₂CH₂—, —COOCH₂CH₂CH₂—, —CONH—C(CH₃)₂—CH₂—, —CONH—CH(CH₃)—CH₂—, —CONH—CH₂—, —CONH—CH₂CH₂— or —CONH—CH₂CH₂CH₂—; and, in the above-described Formula (2), A² represents a single bond, —CH₂—, —C₆H₄—, —O—, —CH₂—O—, —CH₂—O—CH₂—, —C₆H₄—O—, —C₆H₄—O—CH₂—, —COO—, —COOCH₂—, —C₆H₄—COO— or —C₆H₄—COO—CH₂—.

[4] The composition according to [1], wherein the above-described polymer (i) has a weight-average molecular weight, which is measured by GPC, of 300 to 3,000,000.

[5] The composition according to [1], wherein the above-described silane compound (ii) is a compound represented by the following Formula (3):

[Chem. 2]

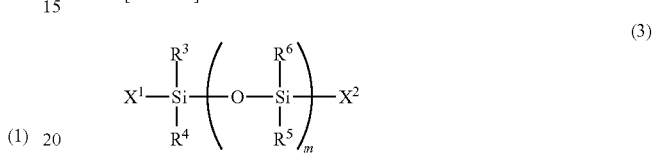

(wherein, in the Formula (3),
X¹ and X² each independently represent a hydroxy group, an alkoxy group having 1 to 4 carbon atoms, or a halogen atom;
R³ to R⁶ each independently represent a hydroxy group, a hydrogen atom, an alkyl group having 1 to 4 carbon atoms, a vinyl group, a phenyl group, an alkoxy group having 1 to 4 carbon atoms, or a halogen atom; and
m represents an integer of 0 to 10,000).

[6] The composition according to [1], wherein the reduced weight ratio of the above-described polymer (i) and the above-described silane compound (ii) is in a range of 99.9/0.1 to 0.1/99.9.

[7] A film, obtained by heat-curing the composition according to any one of [1] to [6].

[8] The film according to [7], which is formed on a substrate.

[9] The film according to [8], wherein the ratio (Sa/Da) of the sulfonic acid concentration in the outer surface (Sa) and the sulfonic acid concentration at the midpoint between an interface in contact with the above-described substrate and the outer surface (Da) is 2 to 1,000.

[10] The film according to any one of [7] to [9], which has a surface water contact angle of 30° or smaller.

[11] A film, which is formed on a substrate and comprises a —SO₃M group (wherein, M represents a hydrogen atom, an alkali metal, an alkaline earth metal or an ammonium ion) and a Si—O—Si structure or a Si—O—C structure, wherein the ratio (Sa/Da) of the SO₃M group concentration in the outer surface of the surface (Sa) and the SO₃M group concentration at the midpoint between an interface in contact with the substrate and the above-described outer surface (Da) is 2 to 1,000.

[12] The film according to [11], wherein the above-described ratio (Sa/Da) is 10 to 1,000.

[13] The film according to [11] or [12], which has a surface water contact angle of 30° or smaller.

[14] A laminate, produced by laminating the film according to any one of [7] to [13] on a substrate.

A hydrophilic film can be obtained by curing any of the above-described compositions and a laminate can be obtained by laminating this film. These hydrophilic film and laminate can be used as an antifogging material, an antifouling material, a quick-drying material, an antistatic material, an undercoat material and the like.

Effects of the Invention

The film of the present invention has an excellent balance of hydrophilicity and abrasion resistance and only a small reduction in the hydrophilicity caused by water, as well as excellent weather resistance. Therefore, a variety of laminates formed by laminating the film of the present invention on a substrate or the like can also be provided.

MODE FOR CARRYING OUT THE INVENTION

Figure 1:
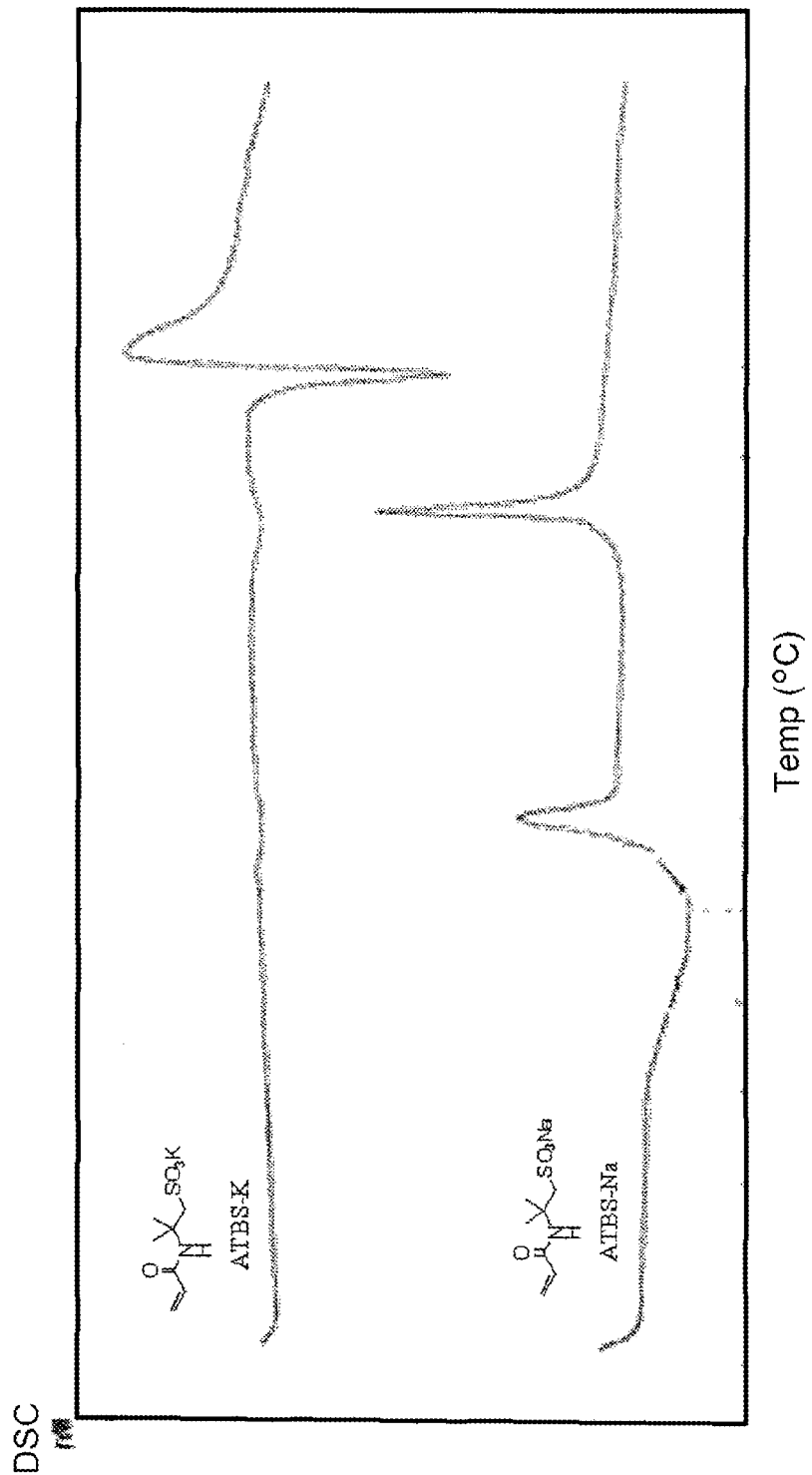
FIG. 1 shows the thermal stability comparative data (DSC chart) of representative compounds having a carbon-carbon double bond-containing polymerizable functional group and a sulfonic acid group, which compounds yield a structural unit that is represented by the Formula (1) and constitutes the polymer (i) used in the present invention.

The film of the present invention can be typically obtained by curing a polymerizable composition, which includes a polymer (i) having a sulfonic acid group and an epoxy group and a silane compound (ii) having two or more groups or atoms that are selected from the group consisting of a hydroxy group bound to a silane atom, an alkoxy group bound to a silane atom and a halogen atom bound to a silane atom, by use of methods, for example, heating. Such film of the present invention is capable of functioning as a hydrophilic film.
Polymer (i) Having a Sulfonic Acid Group and an Epoxy Group In the present invention, as a first component constituting the composition of the present invention, a polymer (i) having a group represented by —SO$_3$M (hereinafter, may be simply referred to as "—SO$_3$M group") and an epoxy group, wherein M represents a hydrogen atom, an alkali metal, an alkaline earth metal or an ammonium ion, is used. However, in the present specification, for convenience of description, such polymer (i) may also be referred to as "polymer (i) having a sulfonic acid group and an epoxy group". Further, unless otherwise specified, the term "sulfonic acid group" used herein may also be used to mean "—SO$_3$M group".

The polymer (i) having a sulfonic acid group and an epoxy group to be used in the present invention may be formed through various condensation or polymerization reactions such as polymer formation by urethane reaction, polymer formation by Michael addition reaction and polymer formation by esterification reaction; however, from the standpoints of the purity, yield and the like of the resulting polymer, the polymer (i) is preferably obtained by polymerization reaction of a monomer including a carbon-carbon double bond-containing polymerizable functional group.

Examples of the carbon-carbon double bond-containing polymerizable functional group include:

polymerizable functional groups having a carbon-carbon double bond in which a polymerizable functional group such as a vinyl group, an allyl group, an isopropenyl group, a styryl group or an α-methylstyryl group is constituted only by carbon atoms and hydrogen atoms (excluding the below-described polymerizable functional groups having an ether structure and a carbon-carbon double bond, polymerizable functional groups having a carbonate structure and a carbon-carbon double bond, polymerizable functional groups having an ester structure and a carbon-carbon double bond, and polymerizable functional groups having an amide structure and a carbon-carbon double bond);

polymerizable functional groups having an ether structure, such as a vinyl ether group, an allyl ether group or an allyl thioether group, and a carbon-carbon double bond;

polymerizable functional groups having a carbonate structure, such as a vinyl carbonate group, an allyl carbonate group or an allyl thiocarbonate group, and a carbon-carbon double bond;

polymerizable functional groups having an ester structure, such as a (meth)acrylate group or a thio(meth)acrylate group, and a carbon-carbon double bond; and polymerizable functional groups having an amide structure, such as a (meth)acrylamide group, and a carbon-carbon double bond.

Thereamong, a vinyl group, an allyl group, a styryl group, a vinyl ether group, an allyl ether group, a (meth)acrylate group and a (meth)acrylamide group are preferred.

Meanwhile, in cases where the polymer (i) is formed by polymerization reaction of polymerizable functional groups having a carbon-carbon double bond, a side chain thereof typically contains, on average, at least one sulfonic acid group and one epoxy group, more precisely, one group represented by —SO$_3$M (wherein, M represents a hydrogen atom, an alkali metal, an alkaline earth metal or an ammonium ion) and one epoxy group, per molecule of the polymer (i); however, the polymer (i) may also contain other side chain of any structure. For example, a side chain having a hydroxy group in addition to a sulfonic acid group or an epoxy group, a side chain having a carboxyl group, a side chain having an alkyl group, a side chain having an aryl group, a side chain having two hydroxy groups resulting from ring-opening of an epoxy group with water, and/or a side chain having an alkoxy group and a hydroxy group that resulted from ring-opening of an epoxy group with an alcohol may also be bound to the polymer (i).

Examples of preferred mode of the polymer (i) having a sulfonic acid group and an epoxy group include a polymer having a structural unit represented by the following Formula (1) and a structural unit represented by the following Formula (2).

[Chem. 3]

(1)

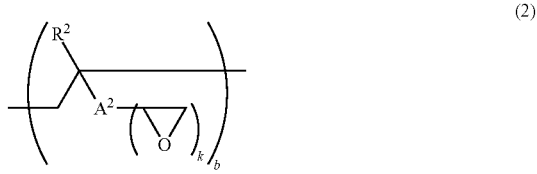

(2)

(wherein, in the Formulae (1) and (2), $R^1$ and $R^2$ independently represent a hydrogen atom or a methyl group;

M represents a hydrogen atom, an alkali metal, an alkaline earth metal or an ammonium ion;

the structural unit ratio, a/b, is 1,000/1 to 1/1,000;

$A^1$ is represented by $(Q1)_f(P1)$;

Q1 is selected from —COO—, —CONH— and a phenylene group which optionally has a substituent;

P1 is selected from the group consisting of a single bond and a divalent or higher valent hydrocarbon group having 1 to 15 carbon atoms which optionally has an ether structure;

f is 0 or 1 and h is 1 to 5;

$A^2$ is represented by $(Q2)_g(P2)$;

Q2 is selected from —COO—, a divalent or higher valent hydrocarbon group having 1 to 5 carbon atoms, a phenylene group which optionally has a substituent and —O—;

P2 is selected from the group consisting of a single bond, —X-P3-, -P4-Y— and -P5-;

P3 to P5 each independently represent a divalent or higher valent hydrocarbon group having 1 to 15 carbon atoms which optionally has an ether structure;

X represents oxygen, sulfur or —COO—;

Y represents oxygen or sulfur;

g is 0 or 1 and k is 1 to 5; and when g is 1 and Q2 is —O— or —COO—, P2 is not —X-P3-).

In P1, the "divalent or higher valent hydrocarbon group having 1 to 15 carbon atoms which optionally has an ether structure" may be any of an aliphatic hydrocarbon group, an alicyclic hydrocarbon group and an aromatic hydrocarbon group, and it may be linear or branched. Further, for example, as in the case of a polyoxyethylene chain, it may also be a hydrocarbon group having an ether structure. The number of carbon atoms is 1 to 15; however, it is more preferably 1 to 12. When the hydrocarbon group contains no ether structure, the number of carbon atoms is preferably 1 to 10.

Further, the hydrocarbon may have any valency of 2 or higher; however, the valency is usually 2 to 6, preferably 2 to 4, more preferably 2 to 3. Moreover, in P1, the hydrocarbon group optionally has a substituent as well. The substituent is not particularly restricted and it may be, for example, a hydroxy group or a halogen group (e.g., a fluoro group or a chloro group).

P3, P4 and P5 in P2 each independently represent a divalent or higher valent hydrocarbon group having 1 to 15 carbon atoms which optionally has an ether structure. Specifically, the hydrocarbon group is specifically the same as that for P1 and may be any of an aliphatic hydrocarbon group, an alicyclic hydrocarbon group and an aromatic hydrocarbon group, and it may be linear or branched. In addition, for example, as in the case of a polyoxyethylene chain, it may also be one which has an ether structure. The number of carbon atoms is 1 to 15; however, it is more preferably 1 to 12. When the hydrocarbon group contains no ether structure, the number of carbon atoms is preferably 1 to 10.

Further, the hydrocarbon may have any valency of 2 or higher; however, the valency is usually 2 to 6, preferably 2 to 4, more preferably 2 to 3. Moreover, in P1, the hydrocarbon group optionally has a substituent as well. The substituent is not particularly restricted and it may be, for example, a hydroxy group or a halogen group (e.g., a fluoro group or a chloro group).

Q2 is selected from —COO—, a divalent or higher valent hydrocarbon group having 1 to 5 carbon atoms, a phenylene group which optionally has a substituent and —O—. Here, the divalent or higher valent hydrocarbon groups having 1 to 5 carbon atoms include, for example, alkylene groups, and specific examples thereof include a methylene group, an ethylene group and a propylene group. In the phenylene group which optionally has a substituent, each substituent may be a hydrocarbon group having 1 to 10 carbon atoms, preferably 1 to 6 carbon atoms, and the substituents may be bound to each other to form a ring.

Alternatively, the above-described substituent may also be, for example, a hydroxy group, a halogen group (e.g., a fluoro group or a chloro group) or an alkoxy or thioalkoxy group having 1 to 10 carbon atoms.

Examples of preferred structure of the above-described Formula (1) include the following modes:

(1-1) a structure derived from sulfonic acid having a (meth)acrylate structure, wherein $R^1$ is hydrogen or methyl, Q1 is —COO— and f=1;

(1-2) a structure derived from sulfonic acid having a (meth)acrylamide structure, wherein $R^1$ is hydrogen or methyl, Q1 is —CONH— and f=1;

(1-3) a structure derived from sulfonic acid having a styryl group or an α-methylstyryl group, wherein $R^1$ is hydrogen or methyl, Q1 is a phenylene group which optionally has a substituent and f=1; and (1-4) a structure derived from sulfonic acid having a vinyl group, wherein $R^1$ is hydrogen and f=0.

It is noted here that, including the above-described structures (1-1) to (1-4), in the above-described Formula (1), h is 1 to 5, preferably 1 to 3, more preferably 1 to 2, and it may be, of course, 1.

In a more specific mode of the above-described Formula (1), $A^1$ is preferably, in particular, a direct bond having no structure (that is, a single bond), —CH$_2$—, —C$_6$H$_4$—, —COOCH$_2$—, —COOCH$_2$CH$_2$—, —COOCH$_2$CH$_2$CH$_2$—, —CONH—C(CH$_3$)$_2$—CH$_2$—, —CONH—CH(CH$_3$)—CH$_2$—, —CONH—CH$_2$—, —CONH—CH$_2$CH$_2$— or —CONH—CH$_2$CH$_2$CH$_2$—.

Further, examples of preferred structure of the above-described Formula (2) include the following modes:

(2-1) a structure derived from an epoxy compound having (meth)acrylate, wherein $R^2$ is hydrogen or methyl, Q2 is —COO— and g=1;

(2-2) a structure derived from an epoxy compound having a styryl group or an α-methylstyryl group, wherein $R^2$ is hydrogen or methyl, Q2 is a phenylene group which optionally has a substituent and g=1;

(2-3) a structure derived from an epoxy compound having a vinyl ether group, wherein $R^2$ is hydrogen, Q2 is —O— and g=1;

(2-4) a structure derived from an epoxy compound having a vinyl group, wherein $R^2$ is hydrogen and g=0; and (2-5) a structure derived from an epoxy compound having an allyl group, wherein $R^2$ is hydrogen, Q2 is a methylene group and g=1.

In cases where the structure of the above-described Formula (2) is that described in the above (2-5), it is preferred that P2 have a structure represented by —X-P3 and X be oxygen.

It is noted here that, including the above-described structures (2-1) to (2-5), in the above-described Formula (2), k is 1 to 5, preferably 1 to 3, more preferably 1 to 2, and it may be, of course, 1.

In a more specific mode of the above-described Formula (2), $A^2$ is preferably, in particular, a direct bond having no structure (that is, a single bond), —CH$_2$—, —C$_6$H$_4$—, —O—, —CH$_2$—O—, —CH$_2$—O—CH$_2$—, —C$_6$H$_4$—O—, —C₆H₄—O—CH₂—, —COO—, —COOCH₂—, —C₆H₄—COO— or —C₆H₄—COO—CH₂—.

M is preferably selected from: a hydrogen atom; alkali metals such as lithium, sodium, potassium and rubidium; alkaline earth metals such as calcium and magnesium; and ammonium ions such as tetrahydroammonium ion, tetramethylammonium ion, tetraethylammonium ion, methyltrihydroammonium ion, ethyltrihydroammonium ion, cyclohexyltrihydroammonium ion, phenyltrihydroammonium ion and dimethyl-phenyl-hydro-ammonium ion. Thereamong, the above-described group represented by SO₃M is preferably not in the form of a free acid, but in the form of being neutralized with a counter-cation such as an alkali metal, an alkaline earth metal or an ammonium ion.

A polymer having a structural unit represented by the Formula (1) and a structural unit represented by the Formula (2) can be obtained by, for example, adding a reaction solvent and a radical polymerization initiator such as peroxide to a compound having a carbon-carbon double bond-containing polymerizable functional group and a sulfonic acid group and a compound having a carbon-carbon double bond-containing polymerizable functional group and an epoxy group and subsequently heating the resulting mixture with stirring. In the present invention, such a polymer including a structural unit represented by the Formula (1) and a structural unit represented by the Formula (2) can be used as the polymer (i) constituting the composition of the present invention.

The structural unit ratio a/b (mol/mol), which is a ratio between the number of the structural unit represented by the Formula (1), a, and the number of the structural unit represented by the Formula (2), b, is controlled by adjusting, for example, the loading ratio of the compound having a carbon-carbon double bond-containing polymerizable functional group and a sulfonic acid group, and the compound having a carbon-carbon double bond-containing polymerizable functional group and an epoxy group.

This structural unit ratio, a/b (mol/mol), for the polymer (i) can be controlled by adjusting the loading ratio of the compound having a carbon-carbon double bond-containing polymerizable functional group and a sulfonic acid group, which corresponds to the structural unit represented by the Formula (1), and the compound having a carbon-carbon double bond-containing polymerizable functional group and an epoxy group, which corresponds to the structural unit represented by the Formula (2), at the time of performing polymerization reaction. The structural unit ratio, a/b (mol/mol), for the polymer (i) is not particularly restricted; however, from the standpoints of the hydrophilicity, performance retainability (durability) and the like, it is usually 1,000/1 to 1/1,000, that is, in a range of 99.9/0.1 to 0.1/99.9, preferably 99/1 to 1/99, more preferably 98/2 to 2/98.

In cases where importance is given to hydrophilicity, it is preferred that the number of the structural unit represented by the Formula (1), a, be relatively large, and the ratio is in a range of, for example, 99.9/0.1 to 40/60, more preferably 99/1 to 50/50, particularly preferably 98/2 to 60/40.

In cases where importance is given to abrasion resistance, durability and the like, it is preferred that the number of the structural unit represented by the Formula (2), b, be relatively large as compared to a case where importance is given to hydrophilicity, the ratio is in a range of, for example, 95/5 to 5/95, more preferably 90/10 to 10/90, particularly preferably 80/20 to 20/80.

Examples of the compound having a carbon-carbon double bond group-containing polymerizable functional group and a sulfonic acid group, which is used to constitute a structural unit represented by the Formula (1), that is, the compound having a carbon-carbon double bond-containing polymerizable functional group and a sulfonic acid group which corresponds to the structural unit represented by the Formula (1), include those compounds that have a structure represented by the following Formula (1'):

[Chem. 4]

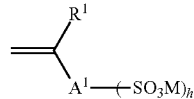

(1')

(wherein, in the Formula (1'), R¹, M, A¹ and h are the same as those of the above-described Formula (1), respectively).

Among such compounds having a carbon-carbon double bond group-containing polymerizable functional group and a sulfonic acid group, sulfonic acid compounds having a vinyl group, sulfonic acid compounds having a styryl group, sulfonic acid compounds having a (meth)acrylate group and sulfonic acid compounds having a (meth)acrylamide group are relatively preferred.

Here, preferably used sulfonic acid compounds having a vinyl group include, for example, a vinyl sulfonic acid, lithium vinylsulfonate, sodium vinylsulfonate, potassium vinylsulfonate and ammonium vinylsulfonate.

Preferably used sulfonic acid compounds having a styryl group include, for example, styrenesulfonic acid, lithium styrene sulfonate, sodium styrene sulfonate, potassium styrene sulfonate, calcium styrene sulfonate, magnesium styrene sulfonate and ammonium styrene sulfonate.

Preferably used sulfonic acid compounds having a (meth)acrylate group include, for example, sodium sulfomethyl (meth)acrylate, 2-sulfoethyl(meth)acrylate, sodium 2-sulfoethyl(meth)acrylate, potassium 2-sulfoethyl(meth)acrylate, 3-sulfopropyl(meth)acrylate, sodium 3-sulfopropyl(meth)acrylate, potassium 3-sulfopropyl(meth)acrylate, calcium 3-sulfopropyl(meth)acrylate, magnesium 3-sulfopropyl (meth)acrylate, ammonium 3-sulfopropyl(meth)acrylate, potassium 6-sulfohexyl(meth)acrylate, potassium 10-sulfodecyl(meth)acrylate, potassium 5-sulfo-3-oxapentyl(meth) acrylate and potassium 8-sulfo-3,6-dioxaoctyl(meth)acrylate.

Preferably used sulfonic acid compounds having a (meth) acrylamide group include, for example, sulfonic acid compounds having a (meth)acryloylamide group such as 1-(meth) acrylamide-methanesulfonic acid, potassium 1-(meth) acrylamide-methanesulfonate, 2-(meth)acrylamide-ethanesulfonic acid, sodium 2-(meth)acrylamide-ethanesulfonate, 2-(meth)acrylamide-propanesulfonic acid, potassium 2-(meth)acrylamide-propanesulfonate, 2-(meth) acrylamide-2-methyl-propanesulfonic acid ((meth)acrylamide-t-butyl sulfonic acid), sodium 2-(meth)acrylamide-2-methyl-propanesulfonate, potassium 2-(meth)acrylamide-2-methyl-propanesulfonate, calcium 2-(meth)acrylamide-2-methyl-propanesulfonate, magnesium 2-(meth)acrylamide-2-methyl-propanesulfonate, ammonium 2-(meth) acrylamide-2-methyl-propylsulfonate and potassium 3-(meth)acrylamide-propanesulfonate.

Among the above-described compounds having a carbon-carbon double bond group-containing polymerizable functional group and a sulfonic acid group, sulfonic acid compounds having a (meth)acrylamide group are most preferred and thereamong, 2-(meth)acrylamide-2-methyl-propyl sulfonic acid ((meth)acrylamide-t-butyl sulfonic acid) and counter-cation salts thereof are preferred and alkali metal salts of 2-(meth)acrylamide-2-methyl-propyl sulfonic acid ((meth)acrylamide-t-butyl sulfonic acid) are most preferred.

With regard to the mode of the sulfonic acid group in the compound having a carbon-carbon double bond-containing polymerizable functional group and a sulfonic acid group, the sulfonic acid group is more preferably in the form of an alkali metal salt, an alkaline earth metal salt or an ammonium salt in which sulfonic acid is neutralized with a counter-cation, rather than in a condition of free sulfonic acid where M constituting the Formula (1') is hydrogen. This is because, when sulfonic acid is neutralized with a counter-cation, reaction between an epoxy group and a sulfonic acid group and the like is inhibited at the time of polymerization reaction and a polymer (i) having a high purity can thus be efficiently obtained. The details of this process will be described below.

When sulfonic acid is not neutralized (M is a hydrogen atom), it may react with the epoxy group of a compound having an epoxy group, which is the other starting material, and gelation of the resulting polymer may occur during co-polymerization reaction. A schematic reaction formula of this reaction between an epoxy group and a sulfonic acid group is shown below.

[Chem. 5]

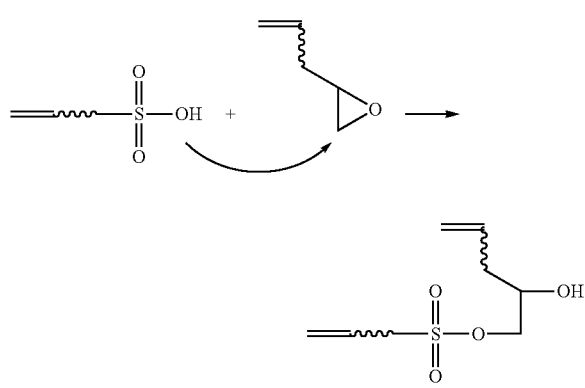

As a method of obtaining a high-purity polymer (i) by inhibiting the above-described reaction, the present inventors have discovered that a method of neutralizing a sulfonic acid group with a counter-cation to inhibit reaction between the sulfonic acid group and an epoxy group is effective. In the same manner, another schematic reaction formula is shown below.

[Chem. 6]

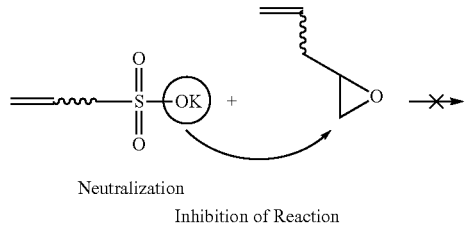

Neutralization
Inhibition of Reaction

-continued

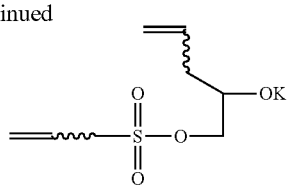

Further, among alkali metals, alkaline earth metals and ammonium ion, which are counter-cations, alkali metals, which tend to have high reaction-inhibiting ability and stability tend to be preferred. Among alkali metals, sodium and potassium are preferred and the most preferred counter-cation is, for example, potassium. Potassium may provide superior thermal stability than sodium, although the reason therefor is not clear. For reference, FIG. 1 shows the thermal stability comparative data (DSC chart) of representative compounds among the above-described compounds having a carbon-carbon double bond-containing polymerizable functional group and a sulfonic acid group.

A method of smoothly obtaining the polymer of the present invention wherein M is a hydrogen atom is not particularly restricted as long as the method is capable of performing a polymerization reaction in such a condition that the above-described ring-opening of an epoxy group by a hydrogen atom does not occur, and examples of such a method include one in which, after neutralizing sulfone groups constituting the above-described compound having a carbon-carbon double bond-containing polymerizable functional group and a sulfonic acid group with a counter-cation to give a corresponding sulfonic acid salt, this sulfonic acid salt is copolymerized with the below-described compound having a carbon-carbon double bond-containing polymerizable functional group and an epoxy group, which compound corresponds to a structural unit represented by the Formula (2), and then treating (reacting) the thus obtained polymer (i) having a sulfonic acid counter-cation base and an epoxy group with an acid such as hydrochloric acid or sulfuric acid to convert it into a free sulfonic acid group.

In order to form a structural unit represented by the Formula (2) which is a structural unit of the polymer (i) of the present invention, as a compound having a carbon-carbon double bond-containing polymerizable functional group and an epoxy group which corresponds to a structural unit represented by the Formula (2), a compound having a carbon-carbon double bond group-containing polymerizable functional group and an epoxy group, which is represented by the following Formula (2'), is preferably used:

[Chem. 7]

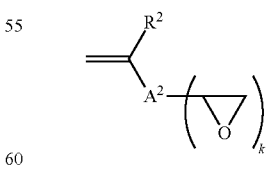

(2')

(wherein, in the Formula (2'), $R^2$, $A^2$ and k are the same as those of the above-described Formula (2), respectively).

Among those compounds having a carbon-carbon double bond group-containing polymerizable functional group and an epoxy group, which are represented by the above-described Formula (2'), epoxy compounds having a vinyl group, epoxy compounds having a vinyl ether group, epoxy compounds having an allyl ether group, epoxy compounds having a styryl group and epoxy compounds having a (meth)acrylate group are relatively preferred.

Here, examples of the epoxy compounds having a vinyl group include butadiene-monoxide, pentadiene-monoxide and hexadiene-monoxide.

Examples of the epoxy compounds having a vinyl ether group include vinylglycidyl ether, butanediol-divinyl ether monoxide, cyclohexane dimethanol-divinyl ether monoxide, 4-glycidyloxymethyl-1-vinyloxymethyl-cyclohexane, diethylene glycol-divinyl ether monoxide, tripropylene glycol-divinyl ether monoxide and 4-vinyloxy-1-glycidyloxy-butane.

Examples of the epoxy compounds having an allyl ether group include allyl-glycidyl ether, allyl-epoxy ether, butanediol-diallyl ether monoxide, cyclohexane dimethanol-diallyl ether monoxide, 4-glycidyloxymethyl-1-allyloxymethyl-cyclohexane, diethylene glycol-diallyl ether monoxide, tripropylene glycol-diallyl ether monoxide and 4-allyloxy-1-glycidyloxy-butane.

Examples of the epoxy compounds having a styryl group include divinylbenzene-monoxide, 4-glycidyloxy-styrene, 3-glycidyloxy-styrene, 2-glycidyloxy-styrene, 4-epoxyoxy-styrene, styryl carboxylic acid epoxy ester and styryl carboxylic acid glycidyl ester.

Examples of the epoxy compounds having a (meth)acrylate group include glycidyl-(meth)acrylate, epoxy-(meth)acrylate, 2-glycidyloxy-ethyl-(meth)acrylate, 5-glycidyloxy-3-oxapentyl-(meth)acrylate, 3-glycidyloxy-2-hydroxy-propyl-(meth)acrylate, 2,3-bis(glycidyloxy)-propyl-(meth)acrylate, trimethylolpropane-diglycidyl ether-(meth)acrylate, {4-glycidyloxyphenyl}-{(4-(meth)acryloyloxy-3-hydroxy-1-oxabutyl)phenyl}-2,2-propane and 7-glycidyloxy-6,6-dimethyl-2-hydroxy-4-oxaheptyl-(meth)acrylate.

Among those compounds having a carbon-carbon double bond-containing polymerizable functional group and an epoxy group that may be used in the production of the polymer (i), epoxy compounds having a (meth)acrylate group, epoxy compounds having an allyl ether group and epoxy compounds having a styryl group are preferred. Examples thereof include glycidyl(meth)acrylate, allylglycidyl ether and 4-glycidyloxystyrene.

In addition to a structural unit represented by the Formula (1) and a structural unit represented by the Formula (2), the polymer (i) of the present invention may also include a third structural unit which is neither the structural unit represented by the Formula (1) nor the structural unit represented by the Formula (2) (hereinafter, referred to as "the third structural unit").

Examples of such third structural unit include those structural units that are generated by copolymerization of compounds having a carbon-carbon double bond-containing polymerizable functional group, which are different from both a compound having a carbon-carbon double bond-containing polymerizable functional group and a sulfonic acid group and a compound having a carbon-carbon double bond-containing polymerizable functional group and an epoxy group.

Examples of such structural units include structural units derived from (meth)acrylic acid; structural units derived from methyl(meth)acrylate; structural units derived from butyl (meth)acrylate; structural units derived from isobornyl(meth)acrylate; structural units derived from tetrahydrofurfuryl (meth)acrylate; structural units derived from phenyl(meth) acrylate; structural units derived from tribromophenyl(meth) acrylate; structural units derived from hydroxyethyl(meth) acrylate; structural units derived from ethyl phosphate(meth) acrylate; structural units derived from tetramethylpiperidyl (meth)acrylate; structural units derived from perfluorooctylethyl(meth)acrylate; structural units derived from thioglycidyl(meth)acrylate; structural units derived from styrene; structural units derived from acrylonitrile; structural units derived from such a small amount of divinylbenzene that gelation does not occur; and structural units derived from such a small amount of allyl(meth)acrylate that gelation does not occur.

Compounds which give such a third structural unit include compounds having a carbon-carbon double bond-containing polymerizable functional group that are neither compounds having a carbon-carbon double bond-containing polymerizable functional group and a sulfonic acid group, which compound has a structure represented by the above-described Formula (1'), nor compounds having a carbon-carbon double bond-containing polymerizable functional group and an epoxy group, which compound has a structure represented by the above-described Formula (2') (hereinafter, such compounds are referred to as "the third structural unit precursor compound"). Examples of compounds that correspond to the above-described structural units include (meth)acrylic acid, methyl(meth)acrylate, butyl(meth)acrylate, isobornyl(meth) acrylate, tetrahydrofurfuryl(meth)acrylate, phenyl(meth)acrylate, tribromophenyl(meth)acrylate, hydroxyethyl(meth)acrylate, ethyl phosphate(meth)acrylate, tetramethylpiperidyl(meth)acrylate, perfluorooctylethyl (meth)acrylate, thioglycidyl(meth)acrylate, styrene, acrylonitrile, divinylbenzene in such a small amount that gelation does not occur, and allyl(meth)acrylate in such a small amount that gelation does not occur.

In the polymer (i) of the present invention, in cases where the above-described third structural unit is introduced, it is blended at the below-described ratio or so.

For example, when the number of the above-described third structural unit, c, with respect to the number of the structural unit represented by the Formula (1), a, and the number of the structural unit represented by the Formula (2), b, is represented by a ratio (a+b)/c (mol/mol), the ratio is in a range of, for example, 99.9/0.1 to 10/90, preferably 99/1 to 50/50, more preferably 95/5 to 60/40. Further, the ratio, (a+b)/c (mol/mol), may also be 70/30 or higher, or 80/20 or higher.

In the polymer (i) of the present invention, the number of the repeating structural units (a+b) is mainly controlled by the solvent type, the substrate (monomer) concentration, the amount of polymerization initiator, the reaction temperature and the like and it is usually in a range of 1 to 10,000, preferably 3 to 3,000, more preferably 30 to 1,500. Further, the molecular weight of the polymer (i) having a sulfonic acid group and an epoxy group is also controlled in the same manner. The weight-average molecular weight (MW) of this polymer (i), which is determined by GPC, is usually in a range of 300 to 3,000,000; however, from the standpoints of the durability and solubility, it is preferably 1,000 to 1,000,000, more preferably 10,000 to 500,000.

Further, in the present invention, the ratio Mw/Mn of the polymer (i) is usually 1 to 10, preferably 1 to 6, more preferably 1 to 4. In this case, the resulting composition tends to have excellent solubility or dispersibility and the resulting cured film tends to have excellent transparency, smoothness or the like.

In the polymer (i) of the present invention, the form of binding between a structural unit represented by the Formula (1) and a structural unit represented by the Formula (2) is not particularly restricted; however, as described below, the binding is preferably formed by radical copolymerization and in that case, the polymer (i) is believed to be in the form of a so-called random copolymer.

As described above, the polymer (i) of the present invention which includes a structural unit represented by the Formula (1) and a structural unit represented by the Formula (2) is obtained by adding a reaction solvent and a polymerization initiator to a compound having a carbon-carbon double bond-containing polymerizable functional group and a sulfonic acid group, which has a structure represented by the above-described Formula (1'), and a compound having a carbon-carbon double bond-containing polymerizable functional group and an epoxy group, which has a structure represented by the above-described Formula (2'), and then allowing these compounds to copolymerize under heating with stirring. In this process, as required, the above-described "third structural unit precursor compound" can also be copolymerized along with the compound having a carbon-carbon double bond-containing polymerizable functional group and a sulfonic acid group, which has a structure represented by the above-described Formula (1'), and a compound having a carbon-carbon double bond-containing polymerizable functional group and an epoxy group, which has a structure represented by the above-described Formula (2').

As the polymerization initiator, a known radical initiator is preferably used, and examples thereof include:

nitriles such as azobisisobutyronitrile;

ketone peroxides such as methylisobutyl ketone peroxide and cyclohexanone peroxide;

diacyl peroxides such as isobutyryl peroxide, o-chlorobenzoyl peroxide and benzoyl peroxide;

dialkyl peroxides such as tris(t-butylperoxy)triazine and t-butylcumyl peroxide;

peroxyketals such as 2,2-bis(4,4-di-t-butylperoxycyclohexyl)propane and 2,2-di(t-butylperoxy)butane;

alkyl peresters such as α-cumylperoxy neodecanoate, t-butylperoxypivalate, 2,4,4-trimethylpentylperoxy-2-ethylhexanoate, t-butylperoxy-2-ethylhexanoate and t-butylperoxy-3,5,5-trimethylhexanoate; and percarbonates such as di-3-methoxybutylperoxy dicarbonate, bis(4-t-butylcyclohexyl)peroxy dicarbonate, t-butylperoxyisopropyl carbonate, diethylene glycol bis(t-butylperoxycarbonate).

The amount of the above-described polymerization initiator to be added is in a range of about 0.01 to 10 wt %, preferably 0.1 to 5 wt %, more preferably 0.2 to 3 wt %, with respect to the total weight of the compound having a carbon-carbon double bond-containing polymerizable functional group and a sulfonic acid group which is represented by the above-described Formula (1'), the compound having a carbon-carbon double bond-containing polymerizable functional group and an epoxy group which is represented by the above-described Formula (2') and the optional above-described "third structural unit precursor compound".

The solvent to be used in the copolymerization of a compound having a carbon-carbon double bond-containing polymerizable functional group and a sulfonic acid group which is represented by the Formula (1'), a compound having a carbon-carbon double bond-containing polymerizable functional group and an epoxy group which is represented by the Formula (2') and the optional above-described "third structural unit precursor compound" is not particularly restricted as long as it does not cause any defect such as inhibition of polymerization reaction. A high-polarity solvent, which improves the solubilities of a compound having a carbon-carbon double bond-containing polymerizable functional group and a sulfonic acid group which is represented by the Formula (1'), a compound having a carbon-carbon double bond-containing polymerizable functional group and an epoxy group which is represented by the Formula (2') and the optional above-described "third structural unit precursor compound", all of which compounds are used as monomers, tends to be preferred. Specific examples of such a high-polarity solvent include alcohols such as methanol, ethanol, isopropanol (IPA), 1-propanol, 1-butanol, cyclohexanol, benzyl alcohol, ethylene glycol, propylene glycol and propylene glycol monomethyl ether; aprotic polar solvents such as acetonitrile, sulfolane, dimethyl sulfoxide, N,N-dimethylformamide (DMF), N,N-dimethylacetamide (DMAc) and N,N-dimethylimidazolidinone (DMI); water; and mixed solvents thereof.

The reaction temperature in the copolymerization of a compound having a carbon-carbon double bond-containing polymerizable functional group and a sulfonic acid group which is represented by the Formula (1'), a compound having a carbon-carbon double bond-containing polymerizable functional group and an epoxy group which is represented by the Formula (2') and the optional above-described "third structural unit precursor compound" which is used as required is primarily set based on the 10-hour half-life temperature of the polymerization initiator, and it is in a range of about room temperature to 200° C., preferably 30 to 120° C., more preferably 40 to 100° C.

The polymer (i) of the present invention produced in this manner is usually a high-molecular-weight polymer including a large number of sulfonic acid groups and often has a property of being soluble only to water. Therefore, in this case, as long as a large amount of water is not used as a reaction solvent, the polymer precipitates out of the reaction system as the reaction proceeds and a desired polymer can thus be obtained simply by filtering out the precipitate and drying it after the completion of the reaction. Meanwhile, in the case of a polymer which includes only a small number of sulfonic acid groups and is thus not likely to precipitate, a method in which the polymer is placed in a poor solvent to be precipitated or a method in which, after distilling off the solvent using an evaporator or the like, the resultant is stirred in a poor solvent and then filtered and dried is relatively preferably employed.

Silane Compound (ii)

As a second component constituting the composition of the present invention, a silane compound (ii) which has a total of two or more groups or atoms that are selected from the group consisting of a hydroxy group bound to a silane atom, an alkoxy group bound to a silane atom and a halogen atom bound to a silane atom is used. A hydroxy group bound to a silane atom is usually obtained by hydrolyzing an alkoxy group bound to a silane atom or a halogen atom bound to a silane atom, and an alkoxy group bound to a silane atom is generally obtained by allowing a halogen atom bound to a silane atom to react with alcohol. The silane compound (ii) of the present invention may have any structure as long as it contains a total of at least two groups or atoms that are selected from the group consisting of a hydroxy group bound to a silane atom, an alkoxy group bound to a silane atom and a halogen atom bound to a silane atom. For example, the silane compound (ii) may have two or more hydroxy groups, alkoxy groups or halogen atoms that are each bound to a silane atom. Among such structures, examples of preferred structure include the following Formula (3):

[Chem. 8]

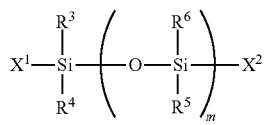

(3)

(wherein, in the Formula (3), $X^1$ and $X^2$ each independently represent a hydroxy group, an alkoxy group having 1 to 4 carbon atoms or a halogen atom;

$R^3$ to $R^6$ each independently represent a hydroxy group, a hydrogen atom, an alkyl group having 1 to 4 carbon atoms, a vinyl group, a phenyl group, an alkoxy group having 1 to 4 carbon atoms or a halogen atom; and m represents an integer of 0 to 10,000).

Here, m is usually in a range of 0 to 10,000, preferably 0 to 100, more preferably 0 to 10.

The phenyl groups represented by $R^3$ to $R^6$ may or may not have a substituent.

The hydroxy groups bound to a silane atom, which are represented by $X^1$, $X^2$ and $R^3$ to $R^6$, has high reactivity and, depending on the case, they are readily dehydrated and condensed even at room temperature to form a siloxane bond (Si—O—Si), thereby being polymerized and cured.

Meanwhile, the alkoxy groups or halogen atoms, which are represented by $X^1$, $X^2$ and $R^3$ to $R^6$, are readily hydrolyzed into hydroxy groups; therefore, polymerization and curing thereof usually proceed via hydroxy groups. However, although an alkoxy group is less reactive than a hydroxy group, alkoxy groups can be directly condensed by, for example, heating at a relatively high temperature (about 100° C. or higher) to form a siloxane bond, thereby being polymerized and cured. That is, the hydroxy groups, alkoxy groups or halogen atoms that are bound to a silane atom are involved in cross-linking and curing reactions in the composition of the present invention. On the other hand, in $R^3$ to $R^6$, the hydrogen atom, alkyl group having 1 to 4 carbon atoms, vinyl group and phenyl group are usually stable and thus not involved in the cross-linking reaction. They generate good effects of, for example, inhibiting cracking and providing toughness; however, they also exert adverse effects such as reduction in the hardness. That is, by adjusting the types and ratios of these substituents that are directly bound to a silane atom, the hardness of the resulting cured film can be controlled within a certain range. In the present invention, of those substituents that are bound to the 4 available dangling bonds of each silane atom, the number of substituents that are not involved in the cross-linking reaction (hydrogen atom, alkyl group having 1 to 4 carbon atoms, vinyl group and phenyl group) tends to be preferably 2 or less and more preferably not more than 1. The total number of hydroxy groups, alkoxy groups having 1 to 4 carbon atoms and halogen atoms, which are involved in the cross-linking reaction, and siloxane bonds that are already reacted tends to be preferably 2 to 4 per silane atom and more preferably 3 to 4.

In the compound represented by the Formula (3), for example, when m is 0, the number of substituents that are not involved in the cross-linking reaction (hydrogen atom, alkyl group having 1 to 4 carbon atoms, vinyl group and phenyl group) is usually 0 to 2, desirably 0 to 1, and it is 0 in a preferred mode. Further, when m is 1 or larger, the number of substituents that are not involved in the cross-linking reaction (hydrogen atom, alkyl group having 1 to 4 carbon atoms, vinyl group and phenyl group) is usually 0 to 2×(m+1), preferably 0 to (m+1).

In this manner, taking advantage of the above-described properties, the silane compound (ii) of the present invention can be readily polymerized and cured usually by hydrolyzing polyalkoxysilane or polyhalogenated silane with an addition of water and subsequently heating the resultant; therefore, it is used as an indispensable component in the composition of the present invention. Examples of polyalkoxysilane or polyhalogenated silane that can be preferably used in the present invention include the followings:

(A) tetraalkoxysilanes such as tetramethoxysilane, tetraethoxysilane, tetrapropoxysilane and tetrabutoxysilane;

(B) trialkoxysilanes such as hydrotrimethoxysilane, methyltrimethoxysilane, methyltriethoxysilane, ethyltriethoxysilane, propyltriethoxysilane, butyltriethoxysilane, phenyltrimethoxysilane, phenyltriethoxysilane, vinyltrimethoxysilane and vinyltriethoxysilane;

(C) dialkoxysilanes such as dimethyldimethoxysilane, dihydrodimethoxysilane, dimethyldimethoxysilane, dimethyldiethoxysilane, dimethyldipropoxysilane, dimethyldibutoxysilane, diphenyldimethoxysilane, divinyldiethoxysilane, hydrophenyldimethoxysilane, methylphenyldimethoxysilane, hydrovinyldimethoxysilane, methylvinyldimethoxysilane and phenylvinyldimethoxysilane;

(D) tetrahalogenated silanes such as tetrachlorosilane, tetrabromosilane and tetraiodosilane;

(E) trihalogenated silanes such as hydrotribromosilane, methyltrichlorosilane, ethyltrichlorosilane, propyltrichlorosilane, butyltrichlorosilane, phenyltrichlorosilane, vinyltrichlorosilane, vinyltribromosilane and vinyltriiodosilane; and (F) dihalogenated silanes such as dihydrodibromosilane, dimethyldichlorosilane, dimethyldibromosilane, dimethyldiiodosilane, diphenyldichlorosilane, divinyldichlorosilane, hydrophenyldichlorosilane, methylphenyldichlorosilane, hydrovinyldichlorosilane, methylvinyldichlorosilane and phenylvinyldichlorosilane.

In order to, for example, improve the hydrolysis reaction rate of above-described (A) to (F), an acidic substance or a basic substance is usually added as a polycondensation catalyst.

As a polycondensation catalyst of the silane compound (ii), an acid catalyst or a base catalyst is commonly used. As an acid catalyst, for example, hydrochloric acid, sulfuric acid, nitric acid, trifluoroacetic acid, acetic acid, phosphoric acid, boric acid, boron trifluoride, tin oxide or tetraalkoxy titanium is employed. As a base catalyst, for example, sodium hydroxide, sodium alkoxide, potassium hydroxide or ammonia is employed.

The amount of the above-described condensation catalyst to be added is preferably in a range of 0.1 to 10 wt %, more preferably 0.2 to 5 wt %, still more preferably 0.3 to 3 wt %, with respect to the total amount of the polymer (i) and silane compound (ii) of the present invention.

From the standpoints of the hydrophilicity, hardness and abrasion resistance, the reduced weight ratio of the polymer (i) and the silane compound (ii) is about 99.9/0.1 to 0.1/99.9, preferably 99/1 to 1/99, more preferably 90/10 to 10/90. In cases where importance is given to hardness, the reduced weight ratio is 60/40 to 10/90, more preferably 50/50 to 10/90. Further, in cases where importance is given to hydrophilicity, the reduced weight ratio is 90/10 to 20/80, more preferably 70/30 to 20/80.

Here, the reduced weight ratio of the polymer (i) and the silane compound (ii) can be determined as a ratio between the weight of the polymer (i) and the weight calculated based on silica or an analogue thereof that corresponds to the silane compound (ii). For example, when the silane compound (ii) is represented by the following Formula (3), the "weight calculated based on silica or an analogue thereof that corresponds to the silane compound (ii)" is determined by the below-described equation.

[Chem. 9]

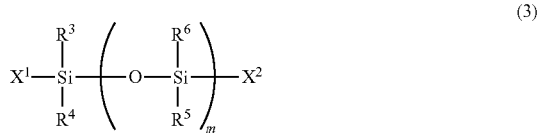

(3)

(wherein, in the Formula (3), $X^1$ and $X^2$ each independently represent a hydroxy group, an alkoxy group having 1 to 4 carbon atoms or a halogen atom; $R^3$ to $R^6$ each independently represent a hydroxy group, a hydrogen atom, an alkyl group having 1 to 4 carbon atoms, a vinyl group, a phenyl group, an alkoxy group having 1 to 4 carbon atoms or a halogen atom; and m represents an integer of 0 to 10,000)

In the total number of $R^3$ to $R^6$ ($R^3+R^4+mR^5+mR^6$), when w of these groups are substituted with $R^{10}$ (wherein, $R^{10}$ represents a hydrogen atom, an alkyl group having 1 to 4 carbon atoms, a vinyl group or a phenyl group; and w represents a number of 0 or larger), the post-polycondensation "weight calculated based on silica or an analogue thereof that corresponds to the silane compound (ii)" is calculated with an assumption that "silica or an analogue thereof that corresponds to the silane compound (ii)" is represented by the following Formula (100).

$$R^{10}{}_w\text{—Si}_{(1+m)}O_{((4+4\times m-w)/2)} \quad (100)$$

The sulfonic acid group of the polymer (i) imparts high hydrophilicity to the resulting cured film and the silane compound (ii) is cross-linked by polycondensation to provide the resulting cured film with not only rigidity but also excellent weather resistance characteristic to inorganic substances. The epoxy group of the polymer (i) reacts with the silanol group of this silane compound (ii) (the reaction formula is shown below as the Formula (4)) to give an effect of incorporating the polymer (i) into the network of the silane compound (ii).

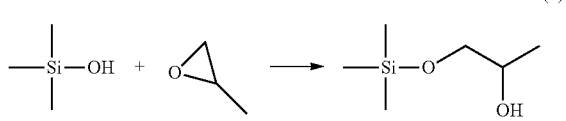

(4)

Therefore, firm fixation of the highly hydrophilic polymer (i) on the cured film gives an effect that release of the highly hydrophilic polymer (i) out of the system is inhibited and high hydrophilicity is thus maintained over an extended period. In addition, incorporation of the highly hydrophilic polymer (i) into the siloxane network of the silane compound provides toughness and improves the abrasion resistance. Moreover, there are also advantages in that, for example, crystallization and generation of a layer-separated structure are likely to be inhibited by the network structure and the resulting film has excellent transparency. Furthermore, since the resulting film contains an inorganic substance, Si, and has a network structure, the film has high stability and excellent weather resistance. That is, as an invention for producing a rigid cured film which maintains high hydrophilicity over an extended period, the method of the present invention in which a polymer (i) having a sulfonic acid group and an epoxy group and a silane compound (ii) are allowed to react and thereby cure is an extremely useful.

Meanwhile, in cases where a cured film is produced by a method other than the method of the present invention, for example, defects of the following (a) to (e) are likely to occur; therefore, such a method may not be considered as a preferred method.

(a) In cases where a polymer which has a sulfonic acid group and no epoxy group is used in place of the polymer (i) of the present invention, high hydrophilicity is attained in the same manner; however, the polymer is released by washing with water or the like and the hydrophilicity is thus likely to be reduced. In addition, since the polymer is not incorporated into the silica network, the strength and the toughness are likely to be low and the abrasion resistance tends to be poor. Also, the transparency may be reduced due to, for example, layer separation between the polymer and silica.

(b) In cases where an epoxy compound having no sulfonic acid group is used in place of the polymer (i) of the present invention, the resulting film is not readily hydrophilized.

(c) In cases where a monomer having a sulfonic acid group and an epoxy group is used in place of the polymer (i) of the present invention, since it is difficult to incorporate a large number of sulfonic acid groups into the monomer having an epoxy group, the number of sulfonic acid groups is small and the hydrophilicity is likely to be lower than that of the present invention. In addition, since the monomer (low molecular weight) migrates readily and unreacted monomer is likely to bleed out or be released out of the system, the use of such a monomer is not preferred also from the standpoints of the performance degradation and the safety after film formation.

(d) In cases where a compound having a sulfonic acid group and a compound having an epoxy group are mixed and used in place of the polymer (i) of the present invention, because
the compound having a sulfonic acid group and the compound having an epoxy group do not react with each other and
since the compound having a sulfonic acid group does not react with the silane compound (ii),
the resulting structure is not readily networked and defects are likely to be generated in the resulting network. Therefore, as compared to a case where the polymer (i) of the present invention is used, the abrasion resistance is more likely to be reduced due to reductions in the hardness and toughness. In addition, because
the compound having an epoxy group tends to have a lower molecular weight and a lower polarity as compared to the polymer (i) of the present invention,
the hydrophobic compound having an epoxy group is more likely to migrate to the surface, so that high hydrophilicity is not likely to be attained.

(e) In cases where the silane compound (ii) of the present invention is not used, the resulting cured film is soft and may thus be readily damaged, which is not practical.

That is, the hydrophilic cured film of the present invention is produced by binding a polymer (i), which is highly hydrophilized by sulfonic acid groups, to a siloxane network that is formed at a high density by allowing epoxy groups of the polymer (i) to react with silanol groups of a silane compound (ii).

Therefore, a curing catalyst or a curing agent which accelerates the reaction between an epoxy group and a silanol group may also be added to the composition of the present invention. Examples of a commonly-used curing catalyst or curing agent include hydrochloric acid, sulfuric acid, trifluoroacetic acid, acetic acid, phosphoric acid, boric acid, alumina, trialkoxy aluminum, acetylacetone aluminum, triethylenediamine, 2-methylimidazole and 2,4-diamino-6-[2'-methylimidazole-(1')]-ethyl-s-triazine.

The amount of the above-described curing catalyst or curing agent to be added is preferably in a range of 0.01 to 30 wt %, more preferably 0.1 to 10 wt %, still more preferably 0.2 to 5 wt %, with respect to the total weight of the loaded polymer (i) and the loaded silane compound (ii).

Surprisingly, the present inventors discovered that, in cured films produced by allowing a highly hydrophilic polymer (i) having a sulfonic acid group and an epoxy group to react with a silane compound (ii), there are cases where the concentration of sulfonic acid groups originated from the polymer (i) is centralized (inclined) in such a mode that the concentration gradually increases from the inner part of the cured film toward the outer surface. It is speculated that the hydrophilicity increases in accordance with the degree of this inclination.

The main principle for forming this gradient structure is that, "when vaporizing a polar solvent added in advance, the vaporization of the polar solvent is made to accompany the hydrophilic polymer (i) having a sulfonic acid group, thereby the polymer (i) is concentrated to the surface and cured".

When the sulfonic acid group concentration in the outer surface opposite to a substrate is defined as "Sa" and the sulfonic acid group concentration at the midpoint between the interface in contact with the substrate and the outer surface is defined as "Da", the degree of gradient in the polymer (i) of the present invention which has a sulfonic acid group is represented by a ratio of the sulfonic acid group concentrations (Sa/Da). That is, a high ratio of the sulfonic acid group concentrations (Sa/Da) indicates that a large number of sulfonic acid groups are concentrated in the outer surface of the subject cured film. This means that the higher the ratio of the sulfonic acid group concentrations (Sa/Da), the higher is the hydrophilicity of the cured film and the more advantageous is the film of the present invention used as a hydrophilic film. Here, with regard to the above-described Da, "the midpoint between the interface in contact with the substrate and the outer surface" is usually the point at which the depth from the outer surface is ½ of the film thickness toward the interface in contact with the substrate (hereinafter, this point is also referred to as "the point of ½ film thickness"). In the descriptions of Sa and Da, the terms "sulfonic acid group" and "sulfonic acid group concentration" mean "—$SO_3M$ group" and "—$SO_3M$ group concentration", respectively.

The degree of gradient (ratio of sulfonic acid concentrations (Sa/Da)) in the film of the present invention is usually in a range of 2 to 1,000, preferably 3 to 100, more preferably 4 to 60, still more preferably 5 to 50. In any case, it is more preferred that the lower limit value be 10 or higher. When the degree of gradient is less than 2, there is a tendency that the water contact angle exceeds 30° and the hydrophilicity is thus reduced. When the degree of gradient is greater than 1,000, the reaction (networking) between the silanol group of the silane compound (ii) and the highly hydrophilic polymer (i) is likely to be incomplete, so that the toughness, transparency and durability (hydrophilicity retainability) tend to be reduced.

In the present invention, an inclined cured film shows even higher hydrophilicity. A non-inclined film (for example, the degree of gradient Sa/Da=1) also shows high hydrophilicity; however, it is lower than the hydrophilicity shown by an inclined cured film. Further, in order to attain hydrophilicity equivalent to that of an inclined cured film in a non-inclined cured film (for example, the degree of gradient Sa/Da=1), a larger amount of hydrophilic polymer (i) is required, and this consequently causes a reduction in the cross-linking density, so that the hardness, scratch resistance, abrasion resistance, durability (hydrophilicity retainability) and the like tend to be also reduced, which is less preferred as compared to the case of an inclined cured film. In the system of the present invention, a film obtained from the composition is believed to have a superior balance of the hydrophilicity (e.g., water contact angle) and the hardness when the —$SO_3M$ group concentration thereof is inclined.

The composition of the present invention is a polymerizable composition including a polymer (i) which is highly hydrophilized by sulfonic acid groups and a silane compound (ii) which reacts with the polymer (i) as indispensable components and, usually, the composition of the present invention is composed of a polymer (i) which is highly hydrophilized by sulfonic acid groups, a silane compound (ii) which reacts with the polymer (i), a catalyst, a curing agent and a solvent which homogenizes or disperses these components.

The solvent to be used in the present invention may be any solvent as long as it is capable of homogenizing or dispersing the components constituting the above-described composition. Such a solvent may be used singly, or in combination of two or more thereof.

In the cured film of the present invention, in cases where it is desired that the hydrophilic polymer (i) be inclined in the film thickness direction (concentrated to the surface), it is preferred to use one or more high-polarity solvents having a high SP value (solubility parameter σ), more specifically one or more solvents having a SP value (solubility parameter σ) of at least 9.4 or higher.

In cases where it is desired that an inclined film be formed using a solvent having a SP value of less than 9.4, it is preferred to employ a method in which the solvent is used in combination with a solvent having a SP value of 9.4 or higher and a solvent having a lower boiling point (faster evaporation rate) than that of the solvent having a SP value of 9.4 or higher is selected.

Here, the SP value (solubility parameter σ; $(cal/cm^3)^{1/2}$) is calculated by the following equations (1) to (5).

$$\text{Latent heat of vaporization per 1 mol (Hb)}=21\times(273+Tb) \text{ [unit: cal/mol], Tb: boiling point of solvent (° C.)} \quad (1)$$

$$\text{Latent heat of vaporization per 1 mol at 25° C. (H25)}=\text{Hb}\times\{1+0.175\times(Tb-25)/100\} \text{ [unit: cal/mol], Tb: boiling point of solvent (° C.)} \quad (2)$$

$$\text{Intermolecular bond energy (E)}=H25-596 \text{ [unit: cal/mol]} \quad (3)$$

$$\text{Intermolecular bond energy per 1 ml } (cm^3) \text{ of solvent (E1)}=E\times D/Mw \text{ [unit: cal/cm}^3\text{], D: density (g/cm}^3\text{), Mw: molecular weight of solvent} \quad (4)$$

$$\text{SP value: solubility parameter } (\sigma)=(E1)^{1/2} \text{ [unit: (cal/cm}^3)^{1/2}\text{]} \quad (5)$$

By using a solvent having such a SP value (solubility parameter σ; $(cal/cm^3)^{1/2}$) of 9.4 or higher, since the solvent shows a certain interaction with a hydrophilic sulfonic acid group originated from the polymer (i), when the resulting mixture is coated onto a substrate and the solvent is subsequently removed from the mixture, the polymer (i) having a hydrophilic sulfonic acid group moves together with the solvent toward the surface of the coated mixture in contact with ambient air and the hydrophilic sulfonic acid group is consequently concentrated in the surface, thereby an inclined structure, in which the hydrophilic sulfonic acid group is concentrated in the outer surface of the cured film obtained in the present invention, is formed.

On the other hand, when a solvent having a solubility parameter σ ((cal/cm$^3$)$^{1/2}$) of less than 9.4 is used, since the above-described interaction is weak, the above-described gradient structure is not adequately formed. From the standpoint of allowing this gradient structure to be formed more readily, the above-described solubility parameter σ ((cal/cm$^3$)$^{1/2}$) is preferably 9.4 or higher, more preferably 10 or higher, still more preferably 11 or higher.

Further, in the present invention, since curing is performed mainly by heating, it is required that a gradient structure be formed and immobilized (cured) by evaporating a solvent in accordance with the heating conditions (e.g., temperature, time, catalyst, curing agent, airflow rate). Therefore, from the standpoint of curing the above-described gradient structure simultaneously with the formation thereof, among the above-described solvents, a solvent tends to be selected based on the boiling point (evaporation rate) in accordance with the curing temperature. Specifically, a solvent having a boiling point of 30 to 300° C. is preferred, a solvent having a boiling point of 40 to 250° C. is more preferred, and a solvent having a boiling point of 50 to 210° C. is still more preferred. Here, in cases where a mixed solvent containing two or more of the above-described solvents is used, the highest boiling point of the mixed solvent may be in the above-described range.

Examples of a compound that has a solubility parameter σ ((cal/cm$^3$)$^{1/2}$) of 9.4 or higher and a boiling point of 50 to 210° C. and can thus be used as the above-described solvent include:

alcohols such as methanol, ethanol, 1-propanol, IPA (isopropanol), 1-butanol, isobutanol, 2-butanol, 1-pentanol, cyclohexanol, 2-methoxyethanol, 2-ethoxyethanol, 1-methoxy-2-propanol, tetrahydrofurfuryl alcohol, ethylene glycol monoacetate, benzyl alcohol, ethylene glycol and 1,2-propylene glycol;

ketones such as cyclohexanone, 2-methylcyclohexanone and acetone;

carboxylic acids such as formic acid, acetic acid and propionic acid;

carboxylic acid esters such as methyl acetate and ethylene glycol diacetate;

ethers such as dioxane, anisole and THF (tetrahydrofuran);

amides such as DMF (N,N'-dimethylformamide) and DMAC (N,N'-dimethylacetamide);

nitriles such as acetonitrile; and water.

Among these compounds, water having the highest solubility parameter σ (21.4 (cal/cm$^3$)$^{1/2}$) and alcohols are preferred. Among these alcohols, primary alcohols such as methanol, ethanol, 1-propanol, 2-methoxyethanol (EGM), 2-ethoxyethanol, 2-methoxypropanol (PGM), 1-butanol, 1-pentanol, 2-methyl-1-butanol and 1-pentanol tend to be preferred. Although these alcohols may be used singly, they are preferably used in the form of a mixture with water.

The above-described compounds having a solubility parameter σ ((cal/cm$^3$)$^{1/2}$) of 9.4 or higher to be contained in a solvent may be used singly, or in combination of two or more thereof.

Further, in cases where the above-described solvent is a mixed solvent containing two or more compounds, at least one of the compounds may satisfy the above-described condition of the solubility parameter. The reason for this is because, in cases where the solubility parameter of at least one of the solvents contained in the mixed solvent satisfies the above-described condition, since the hydrophilic sulfonic acid group originated from the polymer (i) shows a certain interaction with the one solvent, there is no change in that, when the resulting mixture is coated onto a substrate and the solvent is subsequently removed from the mixture, the polymer (i) having a hydrophilic sulfonic acid group moves together with the one solvent toward the surface of the coated mixture in contact with ambient air and, as a result, the hydrophilic sulfonic acid group is concentrated in the surface.

In cases where a mixed solvent containing two or more solvents is used, the compound having the highest boiling point tends to affect the formation of gradient structure. Therefore, it is preferred that the solubility parameter σ ((cal/cm$^3$)$^{1/2}$) of the solvent having the highest boiling point in the mixed solvent be 9.4 or higher.

Even in a mixed solvent composed of solvents having a solubility parameter of 9.4 or higher, it is preferred to use solvents having as high a solubility parameter (polarity) as possible. Further, it is also preferred that the solubility parameter σ ((cal/cm$^3$)$^{1/2}$) of a solvent having a higher boiling point be higher than that of a solvent having a lower boiling point because inclination can be readily attained.

As for the mixing ratio of two or more solvents contained in such a mixed solvent, the weight ratio, the weight of the solvent having the highest solubility parameter/the weight of the other solvent(s), is in a range of preferably 99.9/0.1 to 1/99, more preferably 99/1 to 10/90, still more preferably 98/2 to 30/70.

However, in the case of a mixed solvent containing water, if a solvent other than water is such a low-polarity solvent that dissociates from water, a large amount of water is added or a solvent having an evaporation rate that is excessively faster (low boiling point) than that of water is mixed, the composition of the present invention that is coated is likely to form droplets in the solvent drying step, so that a transparent and smooth film may not be produced due to, for example, a reduction in the leveling property. Therefore, in cases where a mixed solvent containing water is selected, it is vital that the composition of the present invention be made into a uniform solution or a uniform dispersion in advance using a high-polarity solvent that is readily miscible with water. In addition, in order to obtain a smooth and transparent cured film, the mixing ratio in terms of weight, water/solvent (s) other than water, is relatively preferably in a range of 80/20 to 1/99, more preferably 70/20 to 5/95, still more preferably 60/40 to 10/90.

Examples of a method of selecting the type of a non-water solvent to be mixed with water include a method of selecting a high-polarity solvent having a solubility parameter σ ((cal/cm$^3$)$^{1/2}$) of 9.4 or higher; and a selection method based on the ratio of the evaporation rate (with respect to water), R, at an inner temperature actually measured in the solvent drying step. Specifically, a solvent whose ratio of the evaporation rate with respect to water, R, at an inner temperature in the drying step is in a range of 0.1 to 2.0 is preferred, a solvent whose ratio of the evaporation rate, R, is in a range of 0.2 to 1.8 is more preferred, and a solvent whose ratio of the evaporation rate, R, is in a range of 0.3 to 1.5 is still more preferred.

In the present invention, the ratio of evaporation rate, R, is calculated by the following simple equations (A) and (B):

Evaporation rate=saturated vapor pressure (mmHg) at a drying temperature×√(molecular weight); and     (A)

Ratio of evaporation rate with respect to water,
R=evaporation rate of non-water solvent/evaporation rate of water.     (B)

For example, the evaporation rate of water at 50° C. is calculated to be 92.6 and the ratios of the evaporation rate, R, of representative solvents to be dried at 50° are calculated to be as described below. For example, methanol=4.3,
ethanol=2.4,
IPA (2-propanol)=1.8,
1-propanol=1.0,
1-butanol=0.4,
EGM (methoxyethanol)=0.4, and
EGE (ethoxyethanol)=0.3.

Meanwhile, another mode of the present invention is a film which is formed on a substrate and includes a —$SO_3M$ group (wherein, M represents a hydrogen atom, an alkali metal, an alkaline earth metal or an ammonium ion) and a Si—O—Si structure or a Si—O—C structure, wherein the ratio (Sa/Da) of the $SO_3M$ group concentration in the film outer surface (Sa) and the $SO_3M$ group concentration at the midpoint between the interface in contact with the substrate and the above-described outer surface (Da) is 2 to 1,000. Incidentally, the Si—O—Si structure is detected by IR at 1,090 to 1,010 $cm^{-1}$ and the Si—O—C structure can be detected in the same manner at about 1,100 to 1,200 $cm^{-1}$ and 800 to 810 $cm^{-1}$.

The degree of gradient (ratio of sulfonic acid concentrations (Sa/Da)) in the above-described film of the present invention is usually in a range of 2 to 1,000, preferably 3 to 100, more preferably 4 to 60, still more preferably 5 to 50. In any case, it is more preferred that the lower limit value be 10 or higher.

Since the above-described film of the present invention has hydrophilicity and includes a Si—O—Si structure or a Si—O—C structure, it also has excellent hardness, abrasion resistance, weather resistance and the like.

In order to improve the physical properties of a hydrophilic film obtained after curing, a variety of known compounds, such as known additives and known modifiers, may also be added to the composition of the present invention. Examples thereof include ultraviolet absorbers and HALS (light stabilizers) for a further improvement of the weather resistance; antioxidants and radical scavengers for improvement of the heat resistance or inhibition of degradation; organic and inorganic fillers for improvement of the abrasion resistance, provision of toughness or the like, such as silica particles, acrylic resins, polyester resins, polyurethane resins, phenol resins, polyolefin resins and glass fibers; pigments and dyes for coloring; color-adjusting agents for color adjustment, such as bluing agents; metal oxides such as titanium oxide and sulfur compounds such as thioepoxy compounds for attaining a high refractive index; flavoring agents for odor improvement and the like; leveling agents and sagging inhibitors for improvement of the coating properties; and functional group-containing organic and inorganic materials for modification of the resulting cured film such as polyvalent amines, melamine resins, urea resins, polyols, polythiols, acid anhydrides, poly (meth)acrylate compounds, epoxy compounds other than the polymer (i), and silane-silane coupling agents.

By curing the composition of the present invention obtained in this manner, a hydrophilic cured film can be obtained. Further, by coating and curing the composition of the present invention on a substrate, a laminate in which a hydrophilic cured film is laminated on the surface of the substrate can be obtained.

Examples of a substrate to be used in the present invention include organic substrates that are made of PMMA, polycarbonate (PC), PET, ABS, triacetyl cellulose (TAC), polyvinyl chloride, polyethylene (PE), polypropylene (PP), polylactic acid (PLA), poly(thio)urethane resin, poly(thio)urea resin, (thio)epoxy resin or the like; various inorganic substrates that are made of glass, iron, stainless steel, aluminum, nickel, zinc, gold, silver, copper, metal oxide, ceramics, cement, slate, marble, granite, mortar or the like; composite substrates made of a SME (sheet molding compound) or the like that is obtained by conjugating inorganic materials such as glass fiber and calcium carbonate and organic materials such as an unsaturated polyester resin; laminated substrates prepared by laminating the above-described organic substrates, inorganic substrates and composite substrates; various surface-treated substrates, such as substrates obtained by metal-plating the surfaces of the above-described various substrates, substrates that are treated with a chemical agent such as an aqueous zinc phosphate solution, corona-treated substrates, plasma-treated substrates, glow discharge-treated substrates, flame-treated substrates and ITRO-treated substrates; and coated substrates obtained by coating the above-described various substrates with a coating material.

Further, examples of an optical substrate to be used in optical articles and optical devices that are represented by eyeglasses, cameras, lenses, display devices, projectors and the like include substrates in which a hardness-improving transparent acrylic or silica-based material is coated or laminated on the surface of a material having transparency; substrates including an antireflection layer on which a material having a low refractive index is coated or laminated for achieving high transparency; substrates including a multi-layer-type antireflection layer on which a material having a low refractive index and a material having a high refractive index are alternately coated or laminated; and glazed substrates that are imparted with antireflection property by formation of fine irregularities on the surface. Incidentally, in cases where a material of some kind is coated or laminated on the surface of any of these optical substrates, in order to maintain high transparency, the resulting film tends to be made extremely thin, which is different from those cases of ordinary substrates. In cases where a substrate on which the above-described coating or lamination is performed is produced, for example, a known method can be employed. Further, in such a case, it is one of the preferred modes that, for example, when coating and curing the composition of the present invention, the above-described coating or lamination is performed such that a layer coming into direct contact with the composition of the present invention is configured to contain $SiO_2$ as a main component. In this case, superior adhesiveness tends to be attained.

Particularly, in the case of a film to be laminated on an optical substrate, it is preferred that the polymer have a constitution that the ratio of the above-described structural unit represented by the Formula (1) and the above-described structural unit represented by the Formula (2), a/b (hereinafter, may be simply referred to as "the unit ratio (1)/(2)"), is 99/1 to 55/45. Further, it is also preferred that the reduced weight ratio of the polymer (i) and the silane compound (ii), (i)/(ii), be 99/1 to 30/70.

In cases where the adhesion between the above-described substrate and the film of the present invention is low, the substrate may be made into a surface-treated substrate by treating the surface in advance by a known surface treatment method(s) such as corona treatment, plasma treatment, glow discharge treatment, flame treatment and/or ITRO treatment.

Further, in place of or in addition to these treatments, the substrate surface may also be subjected to a primer treatment, an undercoating treatment or an anchor coating treatment to give a treated substrate.

Examples of a coating agent that can be used in the above-described primer treatment, undercoating treatment or anchor coating treatment include coating agents containing, as a main component of a vehicle, a resin such as a polyester-based resin, a polyamide-based resin, a polyurethane-based resin, an epoxy resin, a phenolic resin, a (meth)acrylic resin, a polyvinyl acetate-based resin, a polyolefin-based resin (e.g., polyethylene and polypropylene), a copolymer or modified resin thereof, or a cellulose-based resin. The above-described coating agents may be of either a solvent-type or an aqueous-type.

Among these coating agents, the followings are preferred: modified polyolefin-based coating agents; ethylvinyl alcohol-based coating agents; polyethyleneimine-based coating agents; polybutadiene-based coating agents; polyurethane-based coating agents; polyester-based polyurethane emulsion coating agents; polyvinyl chloride emulsion coating agents; urethane acrylic emulsion coating agents; silicon acrylic emulsion coating agents; vinyl acetate acrylic emulsion coating agents; acrylic emulsion coating agents; styrene-butadiene copolymer latex coating agents; acrylonitrile-butadiene copolymer latex coating agents; methyl methacrylate-butadiene copolymer latex coating agents; chloroprene latex coating agents; polybutadiene latex rubber-based coating agents; polyacrylate latex coating agents; polyvinylidene chloride latex coating agents; polybutadiene latex coating agents; and coating agents composed of a carboxylic acid-modified latex or dispersion of a resin contained in these latex coating agents.

These coating agents can be applied by, for example, a gravure coating method, a reverse roll coating method, a knife coating method or a kiss coating method, and the amount thereof to be applied to a substrate is usually 0.005 g/m$^2$ to 5 g/m$^2$ in a dry state.

Among these coating agents, polyurethane-based coating agents represented by trade names "Takelac™" and "Takenate™" (both of which are manufactured by Mitsui Chemicals, Inc.) are more preferred. Polyurethane-based coating agents have a urethane bond in the main chain or a side chain of the resin contained therein. Polyurethane-based coating agents contain a polyurethane obtained by allowing a polyol, such as polyester polyol, polyether polyol or acrylic polyol, to react with an isocyanate compound.

Among such polyurethane-based coating agents, those which are obtained by mixing a polyester polyol, such as condensed-type polyester polyol or lactone-based polyester polyol, with an isocyanate compound, such as tolylene diisocyanate, hexamethylene diisocyanate, isophorone diisocyanate, norbornane diisocyanate methyl or xylene diisocyanate, are preferred because they have excellent adhesive property.

The method of mixing a polyol compound and an isocyanate compound is not particularly restricted. Further, the mixing ratio is also not particularly restricted; however, when the amount of the isocyanate compound is excessively small, a defect in curing may be induced; therefore, the ratio between the OH group of the polyol compound and the NCO group of the isocyanate compound is preferably in a range of 2/1 to 1/40 in terms of equivalence.

Further, a known silane coupling agent may also be added to the above-described polyol compound and isocyanate compound.

The substrate used in the present invention may include a surface which has been subjected to the above-described surface activation treatment.

Examples of a method of coating the composition of the present invention onto such a substrate include a brush coating method, a spray coating method, a wire bar method, a bar coater method, a blade coating method, a roll coating method, a spin coating method, a dipping method and other known coating methods.

The amount of the composition of the present invention to be coated can be set as appropriate according to its use; however, it is, in terms of the thickness of a hydrophilic film obtained after curing, usually in a range of 0.0001 to 100 μm, preferably 0.001 to 50 μm, more preferably 0.1 to 30 μm.

For example, in outdoor coating applications, the cured film tends to be relatively thick and the coating is performed in a range of about 0.1 to 100 μm, preferably 0.5 to 50 μm, more preferably 1 to 30 μm.

For example, in optical applications where high transparency is required, first and foremost, it is a fundamental premise that the material of the optical substrate to be used itself should be highly transparent and have no internal loss (such as scattering) of transmitting light. In addition, an even higher transparency is often achieved by reducing the surface light reflection with the use of an AR (antireflection) layer or the like. However, when a film having a thickness in the order of not less than micrometers is laminated on this antireflection layer in the same manner as in general applications, since reflection occurs on the surface of the laminated film and the transparency is consequently reduced, the thickness of the cured film tends to be made extremely thin. Specifically, the suitable range of the film thickness on such an optical substrate on which an antireflection layer has been laminated is, for example, 0.0001 to 0.5 μm (0.1 to 500 nm), more preferably 0.0005 to 0.2 μm (0.5 to 200 nm), still more preferably 0.001 to 0.1 μm (1 to 100 nm).

The film of the present invention is usually obtained by curing the composition of present invention which includes a polymer (i) having a sulfonic acid group and an epoxy group and a silane compound (ii) as indispensable components. One example of suitable curing method used therefor is curing by heating.

The temperature at which the composition of the present invention is cured is in a range of about 0 to 300° C., preferably room temperature to 200° C., more preferably 40 to 180° C. The heat-curing time is usually in a range of 0.02 to 200 hours, preferably 0.1 to 8.0 hours, more preferably 0.3 to 4.0 hours.

Meanwhile, the composition of the present invention can also be cured by a method other than heating. For example, the composition of the present invention can be cured by adding a known multifunctional (meth)acrylate, a known multifunctional epoxy compound, a known multifunctional vinyl compound, a known UV radical polymerization initiator, a known UV cationic polymerization initiator and the like to the polymer (i) of the present invention which has a sulfonic acid group and an epoxy group and the silane compound (ii) of the present invention and subsequently irradiating the resulting mixture with radiation. The curing can also be performed by a combination of irradiation with radiation and heating.

In cases where the polymerization is performed using radiation, as the radiation, energy rays in a wavelength range of 0.0001 to 800 nm can be employed. The above-described radiations are classified into α-rays, β-rays, γ-rays, X-rays, electron rays, ultraviolet rays, visible rays and the like, and these radiations can be selected and used as appropriate in accordance with the composition of the above-described mixture. Among these radiations, ultraviolet rays are preferred and the their output peaks are preferably in a range of 200 to 450 nm, more preferably 210 to 445 nm, still more preferably 220 to 430 nm, particularly preferably 230 to 400 nm. When an ultraviolet ray having an output peak in the above-described range is used, occurrence of defects such as yellowing and thermal deformation during the polymerization is limited and, when an ultraviolet absorber is added, the polymerization can be completed in a relatively short period of time. Further, as the type of UV lamp, an electrode-less UV (ultraviolet) lamp which emits only a small amount of infrared radiation and has a high illumination intensity is more preferred than an ordinary electrode-containing UV (ultraviolet) lamp. Moreover, when the above-described composition contains an ultraviolet absorber and a hindered amine-based stabilizer, the use of a UV lamp having an output property that the peak intensity is at 240 to 270 nm tends to be more preferred.

The atmosphere in which the composition of the present invention is cured by heating or radiation may be an inert gas atmosphere of nitrogen or the like; however, the curing is preferably carried out in the air. Further, with regard to the humidity of the atmosphere, it is preferably as low as possible since the surface of the resulting cured film is likely to be heterogeneous under high humidity conditions, and the humidity of the atmosphere is preferably in a range of about 20 to 70% RH, more preferably 30 to 60% RH, still more preferably 40 to 60% RH.

The cured film of the present invention obtained in this manner characteristically has high hydrophilicity and excellent weather resistance because of its structure. Further, among such cured films, inclined films that are formed by, for example, selecting a solvent, in which films sulfonic acid groups are concentrated in the outer surface, not only show considerably higher hydrophilicity than non-inclined films (e.g., degree of gradient, Sa/Da=1) but also maintain a high cross-linking density; therefore, such inclined films also encompass special cured films having excellent hardness, scratch resistance, abrasion resistance and durability (hydrophilicity retainability).

A product obtained by forming the above-described hydrophilic cured film on the surface of a substrate can be used as a laminate including the substrate and the film. For example, in cases where the above-described film is an antifogging coating film, an antifouling coating film or an antistatic coating film, a laminate in which a substrate is covered with the antifogging coating film, the antifouling coating film or the antistatic coating film can be obtained.

For example, in cases where the substrate is a film, an adhesive layer as will be described below can be arranged on a surface on which the film of the present invention is not formed and, on the surface of the adhesive layer, a release film can be further arranged as well. By laminating an adhesive layer on the other surface of the substrate film, the resulting laminated film including the film of the present invention can be easily pasted as an antifogging film or an antifouling film onto glass; mirrors in bathrooms and the like; the surface of display materials such as displays and televisions; information boards such as sign boards, advertisement boards and guide plates; signs of railways, roads and the like; and external walls, window glasses and the like of buildings.

The adhesive to be used in the adhesive layer of a laminate or the like is not particularly restricted and any known adhesive can be used. Examples of the adhesive include acrylic adhesives, rubber-based adhesives, vinyl ether polymer-based adhesives and silicone adhesive. The thickness of the adhesive layer is usually in a range of 2 to 50 μm, preferably 5 to 30 μm.

Further, in the film of the present invention and a laminate in which the film is laminated, the film surface in contact with ambient air may be covered with a covering material. In the film covered with a covering material and a laminate including this film, the film can be protected from being damaged or getting dirty during transport, storage, exhibition and the like.

For example, in the above-described case where the composition of the present invention is "cured by adding a known multifunctional (meth)acrylate, a known multifunctional epoxy compound, a known multifunctional vinyl compound, a known UV radical polymerization initiator, a known UV cationic polymerization initiator and the like to the polymer (i) of the present invention which has a sulfonic acid group and an epoxy group and the silane compound (ii) of the present invention and subsequently irradiating the resulting mixture with UV or EB", by curing the composition of the present invention by irradiation with radiation such as UV or EB while leaving the above-described covering material tightly adhered to the coating film in order to prevent polymerization from being inhibited by oxygen and then preparing a product in which the film of the present invention and the covering material are still laminated on a substrate or the like, the above-described covering material can also be used for the protection of the product from being damaged or getting dirty.

Examples of a material of the film preferably used as the above-described covering material include vinyl alcohol-based polymers such as polyvinyl alcohol (PVA) and ethylene-vinyl alcohol copolymers, polyacrylamide, polyisopropylacrylamide, polyacrylonitrile, polycarbonate (PC), polymethyl methacrylate (PMMA), polyethylene terephthalate (PET), polystyrene (PS) and biaxially-oriented polypropylene (OPP).

The laminate of the present invention can be obtained in a variety of forms by, for example, changing the shape of the substrate. The hydrophilic film and laminate that are obtained by the present invention can be used in the forms of a film, a sheet, a tape and the like. It is noted here that the above-described hydrophilic film can also be used as a primer layer.

Further, by polymerizing, in molds of various shapes, a monomer composition including the polymer (i) of the present invention which has a sulfonic acid group and an epoxy group and the silane compound (ii) of the present invention or a monomer composition including the above-described polymer (i) and silane compound (ii) as well as an organic or inorganic compound(s) that is/are added as required, cured products having various shapes, such as films and molded articles, can also be obtained.

The film of the present invention is excellent in its hydrophilicity, durability, abrasion resistance and weather resistance and has high antifogging, antifouling, antistatic and quick-drying (water evaporation) properties.

The water contact angle of the film obtained by the present invention is usually 30° or smaller, preferably 20° or smaller, more preferably 10° or smaller. A film having a water contact angle of not larger than the above-described upper limit value has high hydrophilicity and readily settles with water (wettable); therefore, it is excellent as a hydrophilic material. Accordingly, this film is useful as, for example, an antifogging material, an antifogging coating film (hereinafter, also referred to as "antifogging coating"), an antifouling material, an antifouling coating film, a self-cleaning coating, an antistatic material, a quick-drying material, a quick-drying coating, an antistatic coating film and an antidust coating.

For example, when the film of the present invention is used as an antifogging coating, since water droplets can spread over the film surface to form a water film, an excellent antifogging effect is exerted. Further, when the film of the present invention is used as a self-cleaning coating, since water can penetrate between dirt and the surface of the coating so as to lift and remove the dirt, an excellent antifouling effect is exerted. Moreover, the film of the present invention has excellent antistatic properties and is thus also useful as an antistatic material, an antistatic coating film and an antidust coating.

The laminate obtained by the present invention also has excellent hydrophilicity and durability; therefore, it is useful as, for example, an antifogging material, an antifouling material and an antistatic material. For example, a laminate obtained by laminating the above-described film of the present invention onto a substrate made of a transparent material such as a transparent resin or glass can be used as a laminate which has excellent transparency, hydrophilicity, antifogging property, antifouling property, antistatic property, quick-drying property, anti-dew condensation property, weather resistance and abrasion resistance.

Therefore, those films and laminates that are obtained by the present invention can be applied in a wide variety of applications, including: materials of transport devices represented by automobiles, ships and planes, such as bodies, wheels, exterior materials and interior materials; building and housing materials such as exterior wall materials, interior wall materials, flooring materials, furniture materials, bathroom materials, powder room materials, kitchen materials (e.g., sinks, ventilation fans and cooking range peripheral members), toilet materials and piping materials; construction materials such as sound-insulating boards installed on highways and the like; clothing materials such as clothes, fabrics and fibers; transparent materials such as window materials, mirrors, optical films, optical disks, contact lenses, goggles, reflection films and reflection boards; optical materials such as eyeglasses, sunglasses, cameras, lenses, antireflection films, materials of display devices (e.g., touch panels, flat panels and electronic papers), projector materials and shields; lighting materials such as lamp materials and light materials; industrial materials such as fins for cooling and heat exchange; electric and electronic materials such as materials of electric appliances and wiring materials; printing materials such as ink-jet printing plates and primers for printing and typesetting; and materials of household supplies such as cosmetic containers.

EXAMPLES

The present invention will now be described in more detail by way of examples and the like; however, the present invention is not restricted to these examples.

In the present invention, the structure of polymer (i) was evaluated as described below.
<Copolymer Composition Ratio>

The unit ratio (1)/(2), which is the ratio of a unit (1) having a sulfonic acid group and a unit (2) having an epoxy group, was analyzed by $^{13}$C-NMR.

The measurement conditions are described below.
Measurement Conditions
  Apparatus: nuclear magnetic resonance apparatus, model AVANCE III cryo-500; manufactured by Bruker BioSpin K.K.
  Measured nucleus: $^{13}$C (125 MHz)
  Measurement mode: single-pulse proton broad band decoupling
  Pulse width: 45° (5.0 μs)
  Number of points: 64 K
  Measurement range: −25 to 225 ppm
  Number of scans: 1,000
  Measurement solvent: $D_2O$
  Measuring temperature: room temperature
  Sample concentration: 40 mg/0.6 ml-$D_2O$ Analysis of Unit Ratio (1)/(2)

The unit ratio (1)/(2) was determined in terms of the integrated intensity ratio between the peak of the f-carbon (about 57 to 59 ppm) in the following Formula (200) and the peak of the k-carbon (about 51 to 52 ppm) in the following Formula (300).

That is, the unit ratio (1)/(2) was calculated by:

Unit Ratio (1)/(2)=Integrated intensity of f-carbon peak/Integrated intensity of k-carbon peak.

[Chem. 11]

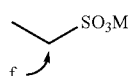
(200)

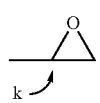
(300)

<Weight-Average Molecular Weight (Mw) and Dispersion (Mw/Mn)>

The weight-average molecular weight, Mw, and the dispersion, Mw (weight-average molecular weight)/Mn (number-average molecular weight), were analyzed by GPC.

The measurement conditions are described below.
Measurement Conditions
  Apparatus: GPC-900, manufactured by JASCO Corporation
  Column: Shodex Asahipac "GF-7M HQ", ϕ7.5 mm×300 mm; manufactured by Showa Denko K.K.
  Measuring temperature: 40° C.
  Eluent: water/methanol/NaHPO$_4$/NaHPO$_4$.2H$_2$O=850.0/ 150.0/2.7/7.3 (weight ratio)
  Flow rate: 0.5 ml/min In the present invention, the physical properties of a coating film were evaluated as described below.
<Measurement of Water Contact Angle>

Using a water contact angle measuring apparatus, model CA-V manufactured by Kyowa Interface Science Co., Ltd., the water contact angle was measured at 3 spots for each sample and the average of the measured values was defined as the water contact angle value of the sample.
<Haze Measurement>

Using a haze meter, NDH2000 manufactured by Nippon Denshoku Industries Co., Ltd., the haze was measured at 4 spots for each sample and the average of the measured values was defined as the haze value of the sample.
<Scratch Resistance Test>

Using a steel wool #0000, a sample was rubbed back and forth 10 times with a certain load being applied thereto. An evaluation "o" was given when no scratch was made; an evaluation "Δ" was given when 1 to 5 scratches were made; and an evaluation "x" was given when 6 to innumerable scratches were made.
<Taber Abrasion Test (JIS K 7204)>
  Measuring apparatus: rotary abrasion tester, manufactured by Toyo Seiki Seisaku-sho, Ltd.
  Abrasive wheel: C180 OXF
  Load: 500 g (250 g+250 g)×2
<Evaluation of Adhesive Property (JIS K 7204)>

The adhesive property was evaluated by cross-cut tape peeling test.

<Evaluation of Antifogging Property>

An evaluation "o" was given when the sample was not breath-fogged and an evaluation "x" was given when the sample was breath-fogged.

<Evaluation of Antifouling Property>

A mark was made using an oil-based marker, "Mckee Extra Fine" (black, product number: MO-120-MC-BK) manufactured by Zebra Co., Ltd. A droplet of water was placed on the mark, left to stand for 30 seconds and then wiped with tissue paper. An evaluation "o" was given when the mark could be removed and an evaluation "x" was given when the mark could not be removed.

<Measurement of Degree of Gradient>

Figure 2:
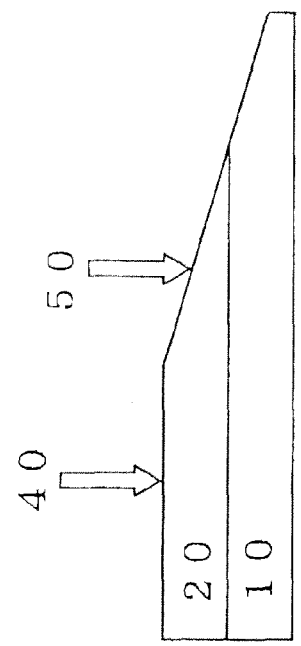
FIG. 2 shows the method of cutting a sample and the sites at which the sulfonic acid concentration is measured for determination of the degree of gradient in the respective samples obtained in examples.
Figure 2:
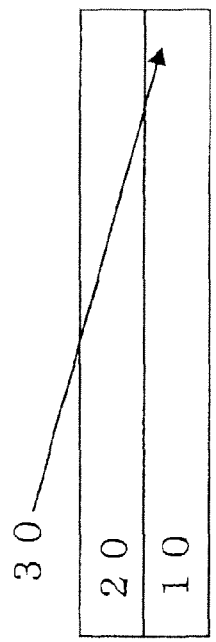

As shown in FIG. 2, a sample composed of a substrate 10 and a coating layer 20 formed thereon was cut obliquely and, using a time-of-flight secondary ion mass spectrometer (TOF-SIMS), the sulfonic acid concentration of the outer surface (Sa) and the sulfonic acid concentration at the midpoint between the interface in contact with the substrate 10 and the above-described outer surface (Da) were measured. From the thus obtained values, the degree of gradient (Sa/Da), which is represented by the ratio of the sulfone concentration in the outer surface of the film in contact with ambient air with respect to the sulfone concentration at the midpoint between the inner and outer surfaces of the film, was determined.

It is noted here that, in the laminate according to the present invention, the film according to the present invention constitutes the coating layer 20.

Analyzer and Measurement Conditions

TOF-SIMS; TOF-SIMS 5, manufactured by ION-TOF GmbH

Primary ion; $Bi_3^{2+}$ (acceleration voltage: 25 kV)

Measurement area; 300 to 340-μm square

For measurement, an electron gun for charge compensation was used.

Sample Preparation, etc.

As shown in FIG. 2, a sample in which a coating layer 20 was formed on a surface of a substrate 10 was precisely cut obliquely in the cutting direction 30. Then, after cutting out the resulting sample into a size of about 10×10 mm² and applying a mesh to the measuring surface, the sample was fixed on a sample holder and, using a time-of-flight secondary ion mass spectrometer (TOF-SIMS), the sulfonic acid concentrations of a coating layer surface 40 in contact with ambient air and that of an inner part of the coating layer 50, which is an inner part of the film (the point of ½ film thickness, the inner surface of the coating layer in contact with the substrate 10), were measured.

Evaluation

Evaluation was performed using the equation below. As the ionic concentration at each measurement point, a relative intensity (with respect to the total detected ions) was used.

Degree of gradient Sa/Da (ratio of sulfonic acid concentrations, degree of gradient)=Sulfonic acid concentration at the coating layer surface 40/Sulfonic acid concentration at the point of ½ film thickness of the coating layer 20

Production of ATBS-K/GMA-Based Polymer

Production Example 1

Production of CH110831 Polymer

First, 434.08 g of ethanol degassed under reduced pressure was charged to a reaction flask and 15.57 g (0.236 mol) of 85 wt %-purity KOH flake was gradually added thereto and completely dissolved with stirring. Then, the resulting solution was neutralized (pH=7.8) by adding thereto 50.00 g (0.241 mol) of acrylamide-t-butyl sulfonic acid (hereinafter, abbreviated as "ATBS") in portions to produce an acrylamide-t-butyl sulfonic acid potassium salt (hereinafter, abbreviated as "ATBS-K").

Next, this neutralized mass was heated to reflux (inner temperature: 63° C.) and a mixture of 3.43 g (0.024 mol) of glycidyl methacrylate (hereinafter, abbreviated as "GMA") and 0.09 g of t-butylperoxy-2-ethylhexanoate (hereinafter, abbreviated as "perbutyl-O") was charged thereto. The resultant was mixed with stirring for 4 hours while being heated to reflux, thereby performing polymerization.

After cooling the resultant to room temperature, crystallized polymer was recovered by filtration and the thus obtained filter cake was washed with methanol. Then, the filter cake was dried under reduced pressure (100 mmHg) at 50° C. until being weighed to give 46.22 g of a white copolymerized polymer "CH110831" (yield=74%).

The thus obtained polymer had a weight-average molecular weight (MW) of 117,000 and Mw/Mn of 2.4, which were determined by GPC, and a copolymerization ratio (ATBS-K unit/GMA unit), which was determined by NMR of the copolymerized polymer, of 4.4/1 (81.4/18.6). It is noted here that no unit having a ring-opened epoxy group was detected.

Production of SPA-K/GMA-Based Polymer

Production Example 2

Production of F1021 Polymer

First, 98.6 g of methanol degassed under reduced pressure and 23.23 g (0.10 mol) of 3-sulfopropylacrylate potassium salt (hereinafter, abbreviated as "SPA-K") were charged to a reaction flask and dissolved by mixing while being heated to reflux (inner temperature: 64° C.). Then, 2.84 g (0.02 mol) of GMA and 0.02 g of azobisisobutyronitrile (hereinafter, abbreviated as "AIBN") were further charged and the resultant was mixed with stirring for 4 hours while being heated to reflux (inner temperature: 64 to 65° C.), thereby performing polymerization.

After cooling the resultant to room temperature, crystallized polymer was recovered by filtration and the thus obtained filter cake was washed with methanol. Then, the filter cake was dried under reduced pressure (100 mmHg) at 50° C. until being weighed to give 21.72 g of a white copolymerized polymer "F1021" (yield=83%).

The thus obtained F1021 polymer had a weight-average molecular weight (MW) of 233,000 and Mw/Mn of 4.7, which were determined by GPC, and a copolymerization ratio (SPA-K unit/GMA unit), which was determined by NMR of the copolymerized polymer, of 90.1/9.9.

Example 1

First, 1.00 g of the polymer "CH110831" of Production Example 1 was added to 4.11 g of water and dissolved by mixing. Then, 4.01 g of 2-methoxyethanol (hereinafter, abbreviated as "EGM"), 3.02 g of tetraethoxysilane (hereinafter, abbreviated as "TEOS") and 0.50 g of 5-wt % sulfuric acid were added and the resultant was mixed with stirring for 1 hour. Finally, the resulting mixture was passed through a filter having an average pore size of 0.5 μm to give a colorless and transparent coating composition. This coating composition had a polymer/TEOS (as $SiO_2$) weight ratio of 1/0.9 (53/47). Here, in the respective Examples including Example 1, the indication "as SiO$_2$" used for the weight of TEOS means that the weight of TEOS was calculated based on SiO$_2$ as "(weight of TEOS×molecular weight of SiO$_2$/molecular weight of TEOS)".

On the surface of a thoroughly washed glass plate (surface water contact angle: <8°), the above-described coating composition was coated using a bar coater #30 and pre-dried at 50° C. for 5 minutes. Then, the coating composition was heat-cured at 150° C. for 1 hour to form a coating film of about 5 μm on the glass surface. After cooling the glass plate to room temperature, the coated surface was washed with water and dried and the thus formed coating film was evaluated.

The results are shown in Table 1.

Here, the film thickness was determined by cutting the sample in the film thickness direction and then observing the cross-section under an electron microscope.

Comparative Example 1

Evaluation of Only TEOS

A coating film of about 5 μm was formed on a glass surface in the same manner as in Example 1, except that the polymer of Production Example 1 and water were not used. The results are shown in Table 1.

to room temperature, the coated surface was washed with water and dried and the coating film of about 2 μm formed on the glass plate surface was evaluated. The results are shown in Table 2.

Comparative Example 2

(Reference: Japanese Laid-open Patent Application (Kokai) No. H11-021512)

The tests were carried out in the same manner as in Example 2, except that 4.8 g of 21-wt % aqueous solution of polystyrene sulfonic acid sodium salt (hereinafter, abbreviated as "PSS-Na") having a molecular weight (MW) of 400,000 to 600,000 was used instead of the polymer of Production Example 1 and the amount of water was changed from 75.0 g to 71.2 g. The results are shown in Table 2.

Comparative Example 3

(Reference: Japanese Laid-open Patent Application (Kokai) No. S61-166824)

To 51.7 g of methyltrimethoxysilane, 20.5 g of 0.036-wt % hydrochloric acid was added, and the resultant was vigorously stirred for 30 minutes. Thereafter, 8.3 g of 2-chloroethanol, 16.5 g of isopropanol and 3.0 g of acetic acid were added and dissolved by mixing to give 100 g of a solution of hydrolyzed methyltrimethoxysilane (25.5 g as silica). Here,

TABLE 1

(Film Thickness: about 5 μm)

| No. | Outer appearance | Water contact angle (°) | Haze (%) | Adhesiveness | Antifogging property | Antifouling property | Composition (weight) ratio |
|---|---|---|---|---|---|---|---|
| Example 1 | transparent | 6 | 0.3 | 100/100 | ○ | ○ | CH110831 sulfonic acid epoxy polymer/TEOS = 53/47 |
| Comparative Example 1 | transparent | 23 | 5.1 | 100/100 | x | ○ | TEOS 100 |

Example 2

First, 1.0 g of the polymer "CH110831" of Production Example 1 was added to 75.0 g of water and dissolved by mixing. Then, 58.0 g of ethanol, 17.4 g of TEOS and 0.9 g of 2N hydrochloric acid (7.3 wt %) were added and the resultant was mixed with stirring for 1 hour. Lastly, the resulting mixture was passed through a filter having an average pore size of 0.5 μm to give a colorless and transparent coating composition. This coating composition had a polymer/TEOS (as SiO$_2$) weight ratio of 1/5 (17/83).

A coating film was formed in the same manner as in Example 1, except that the above-described coating solution was coated using a bar coater #30. After cooling the resultant the indication "as silica" used for the weight of methyltrimethoxysilane means that the weight of methyltrimethoxysilane was calculated based on a silica analogue corresponding to methyltrimethoxysilane, that is, Me—Si(O)$_{1.5}$.

Then, to 100 g of the thus obtained solution of hydrolyzed methyltrimethoxysilane, 100 g of glycerol triglycidyl ether (manufactured by Nagase ChemteX Corporation, Denacol EX-314) and 10 g of an acetylacetone aluminum salt were added as an epoxy compound and a curing agent, respectively, and dissolved by mixing to give a coating solution having a solid content (NV) of 65 wt %.

The tests were carried out in the same manner as in Example 2, except that the solution was coated using a bar coater #04 (epoxy compound/Me—Si(O)$_{1.5}$ weight ratio=80/20). The results are shown in Table 2.

TABLE 2

(Film Thickness: about 2 to 3 μm)

| No. | Outer appearance | Water contact angle (°) | Haze (%) | Adhesiveness | Composition (weight) ratio |
|---|---|---|---|---|---|
| Example 2 | transparent | 12 | 0.1 | 100/100 | CH110831 sulfonic acid epoxy polymer/silica = 17/83 |
| Comparative Example 2 | transparent | 21 | 0.9 | 100/100 | Sulfonic acid polymer PSS-Na/silica = 17/83 |
| Comparative Example 3 | transparent | 44 | 0.3 | 100/100 | Epoxy compound EX-314/silica = 80/20 |

Example 2-2

The tests were carried out in the same manner as in Example 2, except that the coating composition of Example 2 was coated using a bar coater #60 (film thickness: about 4 μm as dry). The results of the scratch resistance test and Taber abrasion test are shown in Table 3.

Comparative Example 2-2

The tests were carried out in the same manner as in Comparative Example 2, except that the coating composition of Comparative Example 2 was coated using a bar coater #60 (film thickness: about 4 μm as dry). The results of the scratch resistance test and Taber abrasion test are shown in Table 3.

Reference Example 1

(Reference: WO 2007/064003)<
Preparation of Coating Solution>

First, 0.3 g of Irgacure 127 (manufactured by Ciba Japan) was added to 2.0 g of methanol and dissolved by mixing.

Then, 0.01 g of Nylostab S-EED (manufactured by Clariant Japan, Co., Ltd.), 0.12 g of 3-sulfopropylacrylate and 6.0 g of 2-methoxyethanol were further added and the resultant was dissolved by mixing.

Subsequently, to the resulting solution, 1.57 g of ethoxylated glycerol triacrylate (manufactured by Shin-Nakamura Chemical Co., Ltd., A-GLY-9E) and 6.3 g of dipentaerythritol penta(or hexa)acrylate (manufactured by Shin-Nakamura Chemical Co., Ltd., A-9530) were added and dissolved by mixing to give a coating solution having a solid content (NV) of 50 wt %.

<Coating of Substrate>

A substrate (manufactured by Takiron Co., Ltd., polycarbonate plate, 100 mm in length×100 mm in width×2 mm in thickness) was coated with the thus obtained coating solution having a solid content (NV) of 50 wt % using a bar coater #06 and immediately placed in a hot-air dryer having a temperature of 40 to 50° C. for 2 to 3 minutes to evaporate the solvent. Then, the resultant was passed through a UV conveyor (manufactured by Fusion UV Systems Japan, electrode-less discharge lamp H bulb, conveyor speed=6 m/min, cumulative amount of light=900 mJ/cm²) to form a transparent film of about 4 μm in thickness on the surface of the substrate. Finally, the surface was washed with running water and then dried using an air gun, and then subjected to the scratch resistance test and Taber abrasion test and the subsequent haze measurement.

The results are shown in Table 3. Here, in Table 3 below, "Acrylic resin 100" indicated in the column of "Composition (weight) ratio" for Reference Example 1 means that the ratio of the acrylic resin in the polymer component constituting the coating solution was 100% in Reference Example 1.

TABLE 3

| | (Scratch Resistance Test and Taber Abrasion Test; Film Thickness: about 4 μm) | | | | | | |
|---|---|---|---|---|---|---|---|
| | Scratch resistance | | Abrasion resistance/Haze (%) | | | | |
| No. | 1-kg load | 3-kg load | 0 rotation | 50 rotations | 100 rotations | 250 rotations | Composition (weight) ratio |
| Example 2-2 | ○ | ○ | 0.1 | 1.8 | 2.5 | 4.1 | CH110831 sulfonic acid epoxy polymer/silica = 17/83 |
| Comparative Example 2-2 | ○ | ○ | 0.1 | 5.7 | film breakage | — | Sulfonic acid polymer PSS-Na/silica = 17/83 |
| Reference Example 1 | ○ | ○ | 0.2 | 9.1 | 19.3 | 43.0 | Acrylic resin 100 |

Example 3

The tests were carried out in the same manner as in Example 1, except that the F1021 polymer of Production Example 2 was coated using a bar coater #60. The resulting coated glass plate on which a hydrophilic film of about 4 μm was formed was subjected to a Xenon weather resistance test.

For comparison, the coated plate obtained in Reference Example 1 was also tested.

The results are shown in Table 4 altogether. It is noted here that, in Table 4, the values represented by "b*" each indicate a value of the b* component in the L*a*b* color system.

TABLE 4

| | (Weather Resistance Test; Film Thickness: about 4 μm) | | | | |
|---|---|---|---|---|---|
| No. | Test period | 0 hour | 1,000 hours | 2,000 hours | Composition (weight) ratio |
| Example 3 | Outer appearance | transparent | transparent | transparent | F1021 sulfonic acid epoxy polymer/TEOS = 53/47 |
| | Water contact angle (°) | 12 | 12 | 10 | |
| | b* | 1.9 | 2.1 | 2.1 | |
| Reference Example 1 | Outer appearance | transparent | degraded/detached | — | Acrylic resin |
| | Water contact angle (°) | 5 | degraded/detached | — | |
| | b* | 1.8 | degraded/detached | — | |

Measuring apparatus: "Ci40000" manufactured by Toyo Seiki Seisaku-sho, Ltd.
Conditions of Xenon Weather Resistance Test
Light source: Xenon lamp, Radiation intensity: 60 W/m² (300 to 400 nm)
BPT: 63° C.
Rainfall: 18/120 minutes
Filter: inside/outside=borosilicate S/borosilicate S Production of SEMA-Na/GMA-Based Polymer Production Example 3

Production of F1022 Polymer

A polymer was synthesized in the same manner as in Production Example 2, except that 21.62 g (0.10 mol) of 2-sulfoethylmethacrylate sodium salt (hereinafter, abbreviated as "SEMA-Na") was used in place of 23.23 g (0.10 mol) of SPA-K.
As a result, 19.7 g of a white copolymerized polymer "F1022" was obtained (yield=81%).
The thus obtained F1022 polymer had a weight-average molecular weight (MW) of 182,000 and Mw/Mn of 3.6, which were determined by GPC, and a copolymerization ratio (SEMA-Na unit/GMA unit), which was determined by NMR of the copolymerized polymer, of 83.0/17.0.
(Hereinafter, Production of ATBS-K/GMA-based Polymers)

Production Example 4

Production of CH120924 Polymer

First, 559.0 g of methanol degassed under reduced pressure was charged to a reaction flask and 9.0 g (0.136 mol) of KOH flake having a purity of 85 wt % was gradually added thereto with stirring and completely dissolved. Then, the resulting solution was neutralized (pH=7.6) by adding thereto 28.9 g (0.136 mol) of ATBS having a purity of 97.8 wt % in portions to produce ATBS-K.
Next, this neutralized mass was heated to reflux (inner temperature: 63° C.) and a mixture consisting of 38.8 g (0.273 mol) of GMA, 0.13 g of perbutyl-O used as a polymerization initiator and 77.8 g of methanol degassed under reduced pressure was charged thereto in three portions over a period of 2 hours. Then, the resultant was mixed with stirring for 4 hours while being heated to reflux, thereby performing polymerization.
The resultant was cooled to room temperature and then filtered, and the resulting filtrate was concentrated using an evaporator. After stirring the thus obtained concentrated residue in 400 ml of ethanol, the resulting sludge was filtered and the thus obtained filter cake was dried under reduced pressure (<100 mmHg) at 50° C. until being weighed to give 27.9 g of a white copolymerized polymer "CH120924" (yield=38%).
The thus obtained polymer had a weight-average molecular weight (MW) of 11,040 and Mw/Mn of 1.2, which were determined by GPC, and a copolymerization ratio (ATBS-K unit/GMA unit), which was determined by NMR of the copolymerized polymer, of 24.6/75.4. It is noted here that, as in Production Example 1, no unit having a ring-opened epoxy group was detected.

Production Example 5

Production of CH120918 Polymer

First, 606.0 g of methanol degassed under reduced pressure was charged to a reaction flask and 15.0 g (0.227 mol) of KOH flake having a purity of 85 wt % was gradually added thereto with stirring and completely dissolved. Then, the resulting solution was neutralized (pH=7.5) by adding thereto 48.2 g (0.227 mol) of ATBS having a purity of 97.8 wt % in portions to produce ATBS-K.
Next, this neutralized mass was heated to reflux (inner temperature: 63° C.) and a mixture consisting of 16.2 g (0.114 mol) of GMA, 0.11 g of perbutyl-O used as a polymerization initiator and 32.5 g of methanol degassed under reduced pressure was charged thereto in three portions over a period of 2 hours. Then, the resultant was mixed with stirring for 4 hours while being heated to reflux, thereby performing polymerization.
The resultant was cooled to room temperature and then filtered, and the resulting filtrate was concentrated using an evaporator. After stirring the thus obtained concentrated residue in 400 ml of ethanol, the resulting sludge was filtered and the thus obtained filter cake was dried under reduced pressure (<100 mmHg) at 50° C. until being weighed to give 23.1 g of a white copolymerized polymer "CH120918" (yield=32%).
The thus obtained polymer had a weight-average molecular weight (MW) of 10,200 and Mw/Mn of 1.2, which were determined by GPC, and a copolymerization ratio (ATBS-K unit/GMA unit), which was determined by NMR of the copolymerized polymer, of 58.6/41.4. It is noted here that, as in Production Example 1, no unit having a ring-opened epoxy group was detected.

Production Example 6

Production of CH110901 Polymer

First, 535.5 g of methanol degassed under reduced pressure was charged to a reaction flask and 23.6 g (0.357 mol) of KOH flake having a purity of 85 wt % was gradually added thereto with stirring and completely dissolved. Then, the resulting solution was neutralized (pH=7.5) by adding thereto 75.7 g (0.357 mol) of ATBS having a purity of 97.8 wt % in portions to produce ATBS-K.
Next, this neutralized mass was heated to reflux (inner temperature: 63° C.) and a mixture of 5.14 g (0.036 mol) of GMA and 0.13 g of perbutyl-O used as a polymerization initiator was charged thereto. Then, the resultant was mixed with stirring for 4.5 hours while being heated to reflux, thereby performing polymerization.
After cooling the resultant to room temperature, crystallized polymer was recovered by filtration and the thus obtained filter cake was washed with methanol. Then, the filter cake was dried under reduced pressure (<100 mmHg) at 50° C. until being weighed to give 88.8 g of a white copolymerized polymer "CH110901" (yield=94%).
The thus obtained polymer had a weight-average molecular weight (MW) of 163,000 and Mw/Mn of 3.4, which were determined by GPC, and a copolymerization ratio (ATBS-K unit/GMA unit), which was determined by NMR of the copolymerized polymer, of 86.9/13.1. It is noted here that, as in Production Example 1, no unit having a ring-opened epoxy group was detected.

Production Example 7

Production of CH111130 Polymer

First, 411.7 g of methanol degassed under reduced pressure was charged to a reaction flask and 15.7 g (0.238 mol) of KOH flake having a purity of 85 wt % was gradually added thereto with stirring and completely dissolved. Then, the resulting solution was neutralized (pH=7.5) by adding thereto 50.0 g (0.236 mol) of ATBS having a purity of 97.8 wt % in portions to produce ATBS-K.

Next, this neutralized mass was heated to reflux (inner temperature: 63° C.) and a mixture of 2.86 g (0.020 mol) of GMA and 0.08 g of perbutyl-O used as a polymerization initiator was charged thereto in three portions over a period of 2 hours. Then, the resultant was mixed with stirring for 4 hours while being heated to reflux, thereby performing polymerization.

After cooling the resultant to room temperature, crystallized polymer was recovered by filtration and the thus obtained filter cake was washed with methanol. Then, the filter cake was dried under reduced pressure (<100 mmHg) at 50° C. until being weighed to give 53.2 g of a white copolymerized polymer "CH111130" (yield=86%).

The thus obtained polymer had a weight-average molecular weight (MW) of 85,000 and Mw/Mn of 2.4, which were determined by GPC, and a copolymerization ratio (ATBS-K unit/GMA unit), which was determined by NMR of the copolymerized polymer, of 88/12. It is noted here that, as in Production Example 1, no unit having a ring-opened epoxy group was detected.

Production Example 8

Production of CH120217 Polymer

First, 797.9 g of methanol degassed under reduced pressure was charged to a reaction flask and 46.3 g (0.701 mol) of KOH flake having a purity of 85 wt % was gradually added thereto with stirring and completely dissolved. Then, the resulting solution was neutralized (pH=7.7) by adding thereto 150.0 g (0.708 mol) of ATBS having a purity of 97.8 wt % in portions to produce ATBS-K.

Next, this neutralized mass was heated to reflux (inner temperature: 63° C.) and a mixture of 3.43 g (0.024 mol) of GMA, 0.24 g of perbutyl-O used as a polymerization initiator and 4.4 g of methanol was charged thereto in three portions over a period of 2 hours. Then, the resultant was mixed with stirring for 4 hours while being heated to reflux, thereby performing polymerization.

After cooling the resultant to room temperature, crystallized polymer was recovered by filtration and the thus obtained filter cake was washed with methanol. Then, the filter cake was dried under reduced pressure (<100 mmHg) at 50° C. until being weighed to give 175.4 g of a white copolymerized polymer "CH120217" (yield=97%).

The thus obtained polymer had a weight-average molecular weight (MW) of 107,000 and Mw/Mn of 3.0, which were determined by GPC, and a copolymerization ratio (ATBS-K unit/GMA unit), which was determined by NMR of the copolymerized polymer, of 95.4/4.6. It is noted here that, as in Production Example 1, no unit having a ring-opened epoxy group was detected.

Production Example 9

Production of CH120206 Polymer

First, 415.8 g of methanol degassed under reduced pressure was charged to a reaction flask and 15.6 g (0.237 mol) of KOH flake having a purity of 85 wt % was gradually added thereto with stirring and completely dissolved. Then, the resulting solution was neutralized (pH=7.3) by adding thereto 50.0 g (0.236 mol) of ATBS having a purity of 97.8 wt % in portions to produce ATBS-K.

Next, this neutralized mass was heated to reflux (inner temperature: 63° C.) and a mixture of 1.14 g (0.008 mol) of GMA, 0.08 g of perbutyl-O used as a polymerization initiator and 0.8 g of methanol was charged thereto in three portions over a period of 2 hours. Then, the resultant was mixed with stirring for 4 hours while being heated to reflux, thereby performing polymerization.

After cooling the resultant to room temperature, crystallized polymer was recovered by filtration and the thus obtained filter cake was washed with methanol. Then, the filter cake was dried under reduced pressure (<100 mmHg) at 50° C. until being weighed to give 60.5 g of a white copolymerized polymer "CH120206" (yield=92%).

The thus obtained polymer had a weight-average molecular weight (MW) of 71,000 and Mw/Mn of 2.3, which were determined by GPC, and a copolymerization ratio (ATBS-K unit/GMA unit), which was determined by NMR of the copolymerized polymer, of 95.1/4.9. It is noted here that, as in Production Example 1, no unit having a ring-opened epoxy group was detected.

Production Example 10

Production of CH120216 Polymer

First, 412.8 g of methanol degassed under reduced pressure was charged to a reaction flask and 15.6 g (0.236 mol) of KOH flake having a purity of 85 wt % was gradually added thereto with stirring and completely dissolved. Then, the resulting solution was neutralized (pH=7.3) by adding thereto 50.0 g (0.236 mol) of ATBS having a purity of 97.8 wt % in portions to produce ATBS-K.

Next, this neutralized mass was heated to reflux (inner temperature: 63° C.) and a mixture of 0.43 g (0.0029 mol) of GMA and 0.08 g of perbutyl-O used as a polymerization initiator was charged thereto. Then, the resultant was mixed with stirring for 6 hours while being heated to reflux, thereby performing polymerization.

After cooling the resultant to room temperature, crystallized polymer was recovered by filtration and the thus obtained filter cake was washed with methanol. Then, the filter cake was dried under reduced pressure (<100 mmHg) at 50° C. until being weighed to give 59.4 g of a white copolymerized polymer "CH120216" (yield=99%).

The thus obtained polymer had a weight-average molecular weight (MW) of 64,000 and Mw/Mn of 2.4, which were determined by GPC, and a copolymerization ratio (ATBS-K unit/GMA unit), which was determined by NMR of the copolymerized polymer, of 98.8/1.2. It is noted here that, as in Production Example 1, no unit having a ring-opened epoxy group was detected.
(Hereinafter, Production of ATBS-K/AGE-based polymers)

Production Example 11

Production of CH120125 Polymer

First, 410 g of methanol degassed under reduced pressure was charged to a reaction flask and 15.7 g (0.237 mol) of KOH flake having a purity of 85 wt % was gradually added thereto with stirring and completely dissolved. Then, the resulting solution was neutralized (pH=7.5) by adding thereto 50.0 g (0.236 mol) of ATBS having a purity of 97.8 wt % in portions to produce ATBS-K.

Next, this neutralized mass was heated to reflux (inner temperature: 63° C.) and a mixture of 75.0 g (0.657 mol) of allylglycidyl ether (hereinafter, abbreviated as "AGE") and 0.34 g of perbutyl-O used as a polymerization initiator was charged thereto. Then, the resultant was mixed with stirring for 5 hours while being heated to reflux, thereby performing polymerization.

After cooling the resultant to room temperature, crystallized polymer was recovered by filtration and the thus obtained filter cake was washed with methanol. Then, the filter cake was dried under reduced pressure (<100 mmHg) at 50° C. until being weighed to give 29.6 g of a white copolymerized polymer "CH120125" (yield=22%).

The thus obtained polymer had a weight-average molecular weight (MW) of 25,000 and Mw/Mn of 1.4, which were determined by GPC, and a copolymerization ratio (ATBS-K unit/AGE unit), which was determined by NMR of the copolymerized polymer, of 84.4/15.6. It is noted here that, as in Production Example 1, no unit having a ring-opened epoxy group was detected.

Production Example 12

Production of CH111008 Polymer

First, 409.3 g of methanol degassed under reduced pressure was charged to a reaction flask and 15.7 g (0.237 mol) of KOH flake having a purity of 85 wt % was gradually added thereto with stirring and completely dissolved. Then, the resulting solution was neutralized (pH=7.5) by adding thereto 50.0 g (0.236 mol) of ATBS having a purity of 97.8 wt % in portions to produce ATBS-K.

Next, this neutralized mass was heated to reflux (inner temperature: 63° C.) and a mixture of 25.0 g (0.219 mol) of AGE and 0.15 g of perbutyl-O used as a polymerization initiator was charged thereto. Then, the resultant was mixed with stirring for 5 hours while being heated to reflux, thereby performing polymerization.

After cooling the resultant to room temperature, crystallized polymer was recovered by filtration and the thus obtained filter cake was washed with methanol. Then, the filter cake was dried under reduced pressure (<100 mmHg) at 50° C. until being weighed to give 36.1 g of a white copolymerized polymer "CH111008" (yield=43%).

The thus obtained polymer had a weight-average molecular weight (MW) of 55,000 and Mw/Mn of 1.7, which were determined by GPC, and a copolymerization ratio (ATBS-K unit/AGE unit), which was determined by NMR of the copolymerized polymer, of 93.1/6.9. It is noted here that, as in Production Example 1, no unit having a ring-opened epoxy group was detected.

Production Example 13

Production of CH120124 Polymer

First, 406.2 g of methanol degassed under reduced pressure was charged to a reaction flask and 15.6 g (0.236 mol) of KOH flake having a purity of 85 wt % was gradually added thereto with stirring and completely dissolved. Then, the resulting solution was neutralized (pH=7.5) by adding thereto 50.0 g (0.236 mol) of ATBS having a purity of 97.8 wt % in portions to produce ATBS-K.

Next, this neutralized mass was heated to reflux (inner temperature: 63° C.) and a mixture of 13.8 g (0.219 mol) of AGE and 0.11 g of perbutyl-O used as a polymerization initiator was charged thereto. Then, the resultant was mixed with stirring for 5.5 hours while being heated to reflux, thereby performing polymerization.

After cooling the resultant to room temperature, crystallized polymer was recovered by filtration and the thus obtained filter cake was washed with methanol. Then, the filter cake was dried under reduced pressure (<100 mmHg) at 50° C. until being weighed to give 26.5 g of a white copolymerized polymer "CH120124" (yield=36%).

The thus obtained polymer had a weight-average molecular weight (MW) of 66,000 and Mw/Mn of 1.8, which were determined by GPC, and a copolymerization ratio (ATBS-K unit/AGE unit), which was determined by NMR of the copolymerized polymer, of 94.7/5.3. It is noted here that, as in Production Example 1, no unit having a ring-opened epoxy group was detected.

Production Example 14

Production of CH111007 Polymer

First, 415.7 g of methanol degassed under reduced pressure was charged to a reaction flask and 15.8 g (0.239 mol) of KOH flake having a purity of 85 wt % was gradually added thereto with stirring and completely dissolved. Then, the resulting solution was neutralized (pH=7.6) by adding thereto 50.5 g (0.238 mol) of ATBS having a purity of 97.8 wt % in portions to produce ATBS-K.

Next, this neutralized mass was heated to reflux (inner temperature: 63° C.) and a mixture of 2.75 g (0.024 mol) of AGE and 0.09 g of perbutyl-O used as a polymerization initiator was charged thereto. Then, the resultant was mixed with stirring for 4 hours while being heated to reflux, thereby performing polymerization.

After cooling the resultant to room temperature, crystallized polymer was recovered by filtration and the thus obtained filter cake was washed with methanol. Then, the filter cake was dried under reduced pressure (<100 mmHg) at 50° C. until being weighed to give 47.5 g of a white copolymerized polymer "CH111007" (yield=76%).

The thus obtained polymer had a weight-average molecular weight (MW) of 68,000 and Mw/Mn of 2.0, which were determined by GPC, and a copolymerization ratio (ATBS-K unit/AGE unit), which was determined by NMR of the copolymerized polymer, of 98.3/1.7. It is noted here that, as in Production Example 1, no unit having a ring-opened epoxy group was detected.

(Hereinafter, Coating Test)

Example 4

First, to 5 g of the CH110901 polymer (unit ratio (sulfonic acid/epoxy)=87/13, MW=163,000, Mw/Mn=3.4) obtained in Production Example 6 was added 28 g of water and the polymer was dissolved by mixing. Then, 35 g of EGM (2-methoxyethanol), 26 g of TEOS (tetraethoxysilane) and 6 g of 5-wt % sulfuric acid were added and the resultant was mixed with stirring for 30 minutes. The resulting mixture was passed through a filter having an average pore size of 0.5 μm to give a colorless and transparent coating composition. This composition had a polymer/TEOS (as $SiO_2$) weight ratio of 1/1.5 (40/60).

On the surface of a thoroughly washed glass plate (surface water contact angle: <8°), the above-described coating composition was coated using a bar coater #24 and pre-dried at 50° C. for 5 minutes. Then, the resulting glass plate was heated at 170° C. for 1 hour to form a coating film of about 3 μm on the glass surface. After cooling the glass plate to room temperature, the coated surface was washed with water and the thus formed film was evaluated.

The results are shown in Table 5.

Mw/Mn=3.4) and the amount of water was changed from 28 g to 12.1 g.

The results are shown in Table 5.

Comparative Example 7

The tests were carried out in the same manner as in Example 4, except that the CH110901 polymer was not used.

The results are shown in Table 5.

TABLE 5

(Film Thickness: about 3 μm)

| | Outer appearance | Water contact angle (°) | Taber abrasion test (haze value) | | | Note (weight ratio) |
|---|---|---|---|---|---|---|
| | | | 0 rotation | 50 rotations | 100 rotations | |
| Example 4 | transparent | 7 | 0.1% | 6.0% | 14.3% | CH110901 sulfonic acid epoxy polymer/silica = 40/60 |
| Comparative Example 4 | transparent | 8 | 2.5% | cracked/detached | — | Sulfonic acid polymer/silica = 40/60 |
| Comparative Example 5 | transparent | 44 | 1.1% | 3.1% | 3.8% | Epoxy compound/silica = 40/60 |
| Comparative Example 6 | transparent | 15 | 3.0% | 18.6% | 19.7% | Sulfonic acid polymer/Epoxy compound/silica = 39.6/0.4/60 |
| Comparative Example 7 | transparent | 25 | 1.7% | cracked/detached | — | TEOS 100 |

Comparative Example 4

The tests were carried out in the same manner as in Example 4, except that 24 g of PSS-Na having a molecular weight of 400,000 to 600,000 (polystyrene sulfonic acid sodium salt, 21-wt % aqueous solution) was used instead of the CH110901 polymer (unit ratio (sulfonic acid/epoxy)=87/13, MW=163,000, Mw/Mn=3.4) and the amount of water was changed from 28 g to 9 g.

The results are shown in Table 5.

Comparative Example 5

The tests were carried out in the same manner as in Example 4, except that 24 g of an epoxy compound, glycerol triglycidyl ether (manufactured by Nagase ChemteX Corporation, Denacol EX-314), was used instead of the CH110901 polymer (unit ratio (sulfonic acid/epoxy)=87/13, MW=163,000, Mw/Mn=3.4).

The results are shown in Table 5.

Comparative Example 6

The tests were carried out in the same manner as in Example 4, except that 20.7 g of polystyrene sulfonic acid sodium salt having a molecular weight of 400,000 to 600,000 (21-wt % aqueous solution) and 0.2 g of glycerol triglycidyl ether (manufactured by Nagase ChemteX Corporation, Denacol EX-314) were used instead of the CH110901 polymer (unit ratio (sulfonic acid/epoxy)=87/13, MW=163,000, Examples 5 to 18

Preparation of Cured Films Using the Sulfonic Acid Epoxy Polymers Produced in Production Examples 1 to 14

First, to 6.3 g of each of the polymers obtained in Production Examples 1 to 14 was added 35.2 g of water and the polymer was dissolved by mixing. Then, 31.3 g of EGM (2-methoxyethanol), 21.7 g of TEOS (tetraethoxysilane) and 5.6 g of 5-wt % sulfuric acid were added and the resultant was each mixed for 30 minutes. The resulting mixture was passed through a filter having an average pore size of 0.5 μm to give a colorless and transparent coating composition having a solid content (polymer+$SiO_2$) of 12.6 wt %.

This composition had a polymer/TEOS (as $SiO_2$) weight ratio of 1/1 (50/50).

On a surface of a thoroughly washed blue glass plate (surface water contact angle: <8°), the above-described coating composition was coated using a bar coater #16 and pre-dried at 50° C. for 3 minutes. Then, the resulting glass plate was heated at 150° C. for 1 hour to form a coating film of about 2 μm on the glass surface. After cooling the glass plate to room temperature, the coated surface was washed with water and then dried using an air gun, followed by evaluation of the thus formed film.

The results are shown in Table 6.

TABLE 6

Evaluation of Cured Films Prepared by use of the Polymers Produced in Production Examples 1 to 14 (Film Thickness: about 2 μm)

| | Properties of cured film | | | | Used polymer | | | | | | |
|---|---|---|---|---|---|---|---|---|---|---|---|
| | Outer appearance | Water contact angle | Breath-fogging resistance | Anti-fouling property | Production No. | Polymer No. | Sulfonic acid unit, a | Molar ratio | Epoxy unit, b | Molar ratio | Mw | Mw/Mn |
| Example 5 | transparent | 10 | ○ | ○ | Production Example 2 | F-1021 | SPA-K | 90.1 | GMA | 9.9 | 233,000 | 4.7 |
| Example 6 | transparent | 13 | ○ | ○ | Production Example 3 | F-1022 | SEMA-Na | 83.0 | GMA | 17.0 | 182,000 | 3.6 |
| Example 7 | transparent | 34 | x | ○ | Production Example 4 | CH120924 | ATBS-K | 24.6 | GMA | 75.4 | 11,040 | 1.2 |
| Example 8 | transparent | 9 | ○ | ○ | Production Example 5 | CH120918 | ATBS-K | 58.6 | GMA | 41.4 | 10,200 | 1.2 |
| Example 9 | transparent | 6 | ○ | ○ | Production Example 1 | CH110831 | ATBS-K | 81.4 | GMA | 18.6 | 117,000 | 2.4 |
| Example 10 | transparent | 4 | ○ | ○ | Production Example 6 | CH110901 | ATBS-K | 86.9 | GMA | 13.1 | 163,000 | 3.4 |
| Example 11 | transparent | 5 | ○ | ○ | Production Example 7 | CH111130 | ATBS-K | 88.0 | GMA | 12.0 | 85,000 | 2.4 |
| Example 12 | transparent | 4 | ○ | ○ | Production Example 8 | CH120217 | ATBS-K | 95.4 | GMA | 4.6 | 107,000 | 3.0 |
| Example 13 | transparent | 4 | ○ | ○ | Production Example 9 | CH111206 | ATBS-K | 95.1 | GMA | 4.9 | 71,000 | 2.3 |
| Example 14 | transparent | 4 | ○ | ○ | Production Example 10 | CH120216 | ATBS-K | 98.8 | GMA | 1.2 | 64,000 | 2.4 |
| Example 15 | transparent | 6 | ○ | ○ | Production Example 11 | CH120125 | ATBS-K | 84.4 | AGE | 15.6 | 25,000 | 1.4 |
| Example 16 | transparent | 5 | ○ | ○ | Production Example 12 | CH111108 | ATBS-K | 93.1 | AGE | 6.9 | 55,000 | 1.7 |
| Example 17 | transparent | 5 | ○ | ○ | Production Example 13 | CH120124 | ATBS-K | 94.7 | AGE | 5.3 | 66,000 | 1.8 |
| Example 18 | transparent | 4 | ○ | ○ | Production Example 14 | CH111007 | ATBS-K | 98.3 | AGE | 1.7 | 68,000 | 2.0 |

Examples 19 to 21

Blending Ratio of Silica

The tests were carried out in the same manner as in the above-described Examples 5 to 18, except that the blending ratio of the CH110901 polymer obtained in Production Example 6 and TEOS (as $SiO_2$) was changed.

The results are shown in Table 7 along with the results from Examples 4 and 10.

TABLE 7

| No. | *Polymer/$SiO_2$ (weight ratio) | Water contact angle (°) | Taber abrasion resistance (haze %) | | Adhesiveness |
|---|---|---|---|---|---|
| | | | 0 rotation | 50 rotations | |
| Example 19 | 57/43 | 4 | not measured | not measured | 100/100 |
| Example 10 | 50/50 | 4 | 0.3 | 25.4 | 100/100 |
| Example 4 | 40/60 | 7 | 0.1 | 6.0 | 100/100 |
| Example 20 | 33/67 | 9 | 0.1 | 2.0 | 100/100 |
| Example 21 | 25/75 | 12 | 0.1 | 6.7 | 100/100 |

Example 22

Coating of Optical Substrate Having an Antireflection Layer 1

First, to 1.0 g of the CH110901 polymer obtained in Production Example 6 was added 5.0 g of water and the polymer was dissolved by mixing. Then, 47.3 g of EGM (2-methoxyethanol), 2.6 g of TEOS (tetraethoxysilane) and 2.5 g of 5-wt % sulfuric acid were added and the resultant was mixed for 30 minutes. The resulting mixture was passed through a filter having an average pore size of 0.5 μm to give a colorless and transparent coating composition having a solid content of 3.0 wt % (polymer+TEOS (as $SiO_2$)).

This composition had a polymer/TEOS (as $SiO_2$) weight ratio of 4/3 (57/43).

On both sides of a 2 mm-thick optical substrate prepared by laminating an AR (anti-reflection) layer on both sides of a glass plate, the above-described composition was coated using a tissue paper impregnated with the composition and pre-dried at 50° C. for 3 minutes. Then, after heating the resultant at 170° C. for 1 hour and cooling it to room temperature, the coated surface was washed with water and dried using an air gun, followed by evaluation of the resulting film.

By observation under an electron microscope (SEM), it was found that a coating film of about 20 to 80 nm was formed on the AR coating.

The evaluation results of this film are shown in Table 8.

TABLE 8

Figure 3:
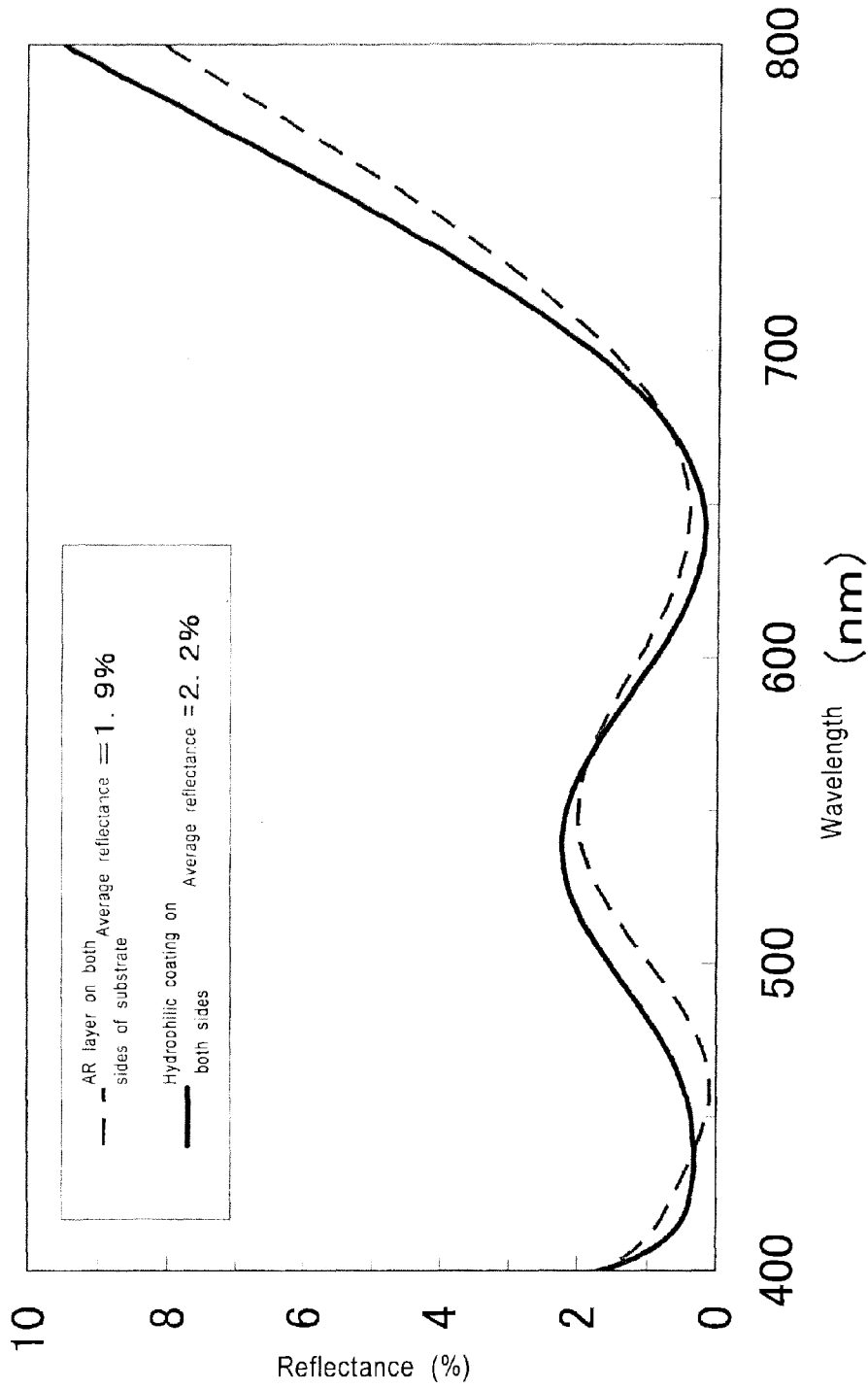
FIG. 3 shows the reflectance of the AR coating obtained in Example 22.
Figure 4:
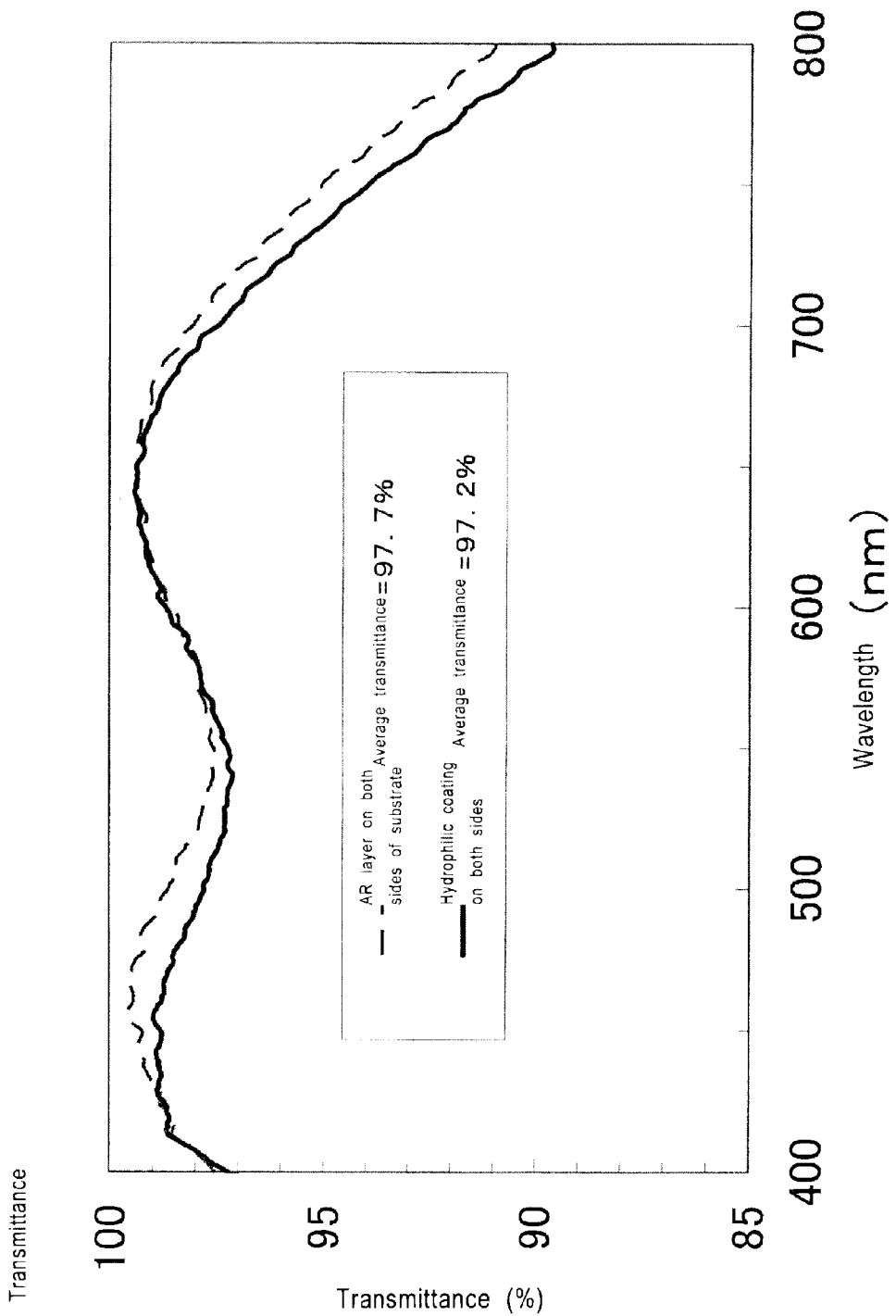
FIG. 4 shows the transmittance of the AR coating obtained in Example 22.

|  |  | Example 22 |
|---|---|---|
| Coating agent | Polymer No. | CH110901 |
|  | Polymer/SiO$_2$ (weight ratio) | 4/3 (57/43) |
| Evaluation of cured film | Film thickness | 20 to 80 nm |
|  | Outer appearance | transparent |
|  | Water contact angle | 4° |
|  | *Breath-fogging resistance | ○ |
|  | Antifouling property | ○ |
|  | **Antireflection property (visual inspection) | ○ |
|  | Reflectance (both sides) | FIG. 3 |
|  | Transmittance | FIG. 4 |

*An evaluation "x" was given when the film was breath-fogged and an evaluation "○" was given when the film was not breath-fogged.
**By visual observation, an evaluation "○" was given when reflection of an image was weak and the see-through visibility was good, and an evaluation "x" was given when reflection of an image was strong and the see-through visibility was poor.

(Measurement of Reflectance and Transmittance)

Measuring apparatus: UV-visible-near infrared spectrophotometer "U-4100", manufactured by Hitachi, Ltd.

Measurement method: transmission method, specular reflection method (incidence angle: 5°, absolute reflectance)

Measurement wavelength range: 400 to 800 nm

Scanning speed: 300 nm/minute

Sampling interval: 1 nm

Split width: 6 nm

The substrate used in the above-described Example 22 has a structure in which a highly transparent material (glass) having hardly any internal loss (such as scattering) of transmitting light is used and reflection of light by the surface is reduced by the AR (anti-reflection) layer. It is expected that, by laminating a film having a thickness in the order of not less than micrometers on this antireflection layer in the same manner as in general applications, the transparency is largely reduced due to reflection on the laminated film surface.

In Example 22, in order to reduce reflection by this newly laminated hydrophilic film, the hydrophilic film was cured and laminated in the form of an extremely thin film of 20 to 80 nm in thickness. As a result, the reflection by the hydrophilic film surface was reduced, and a laminate was obtained which has a high transparency (without loss of the antireflection property) and high hydrophilicity and thus be satisfactorily usable for optical applications.

Example 23

Coating of Optical Substrate Having an Antireflection Layer 2

Preparation of Optical Substrate

A homogeneous solution was prepared by mixing and dissolving 50.6 g of MR-8A™, 23.9 g of MR-8B1™ and 25.5 g of MR-8B2™, all of which are manufactured by Mitsui Chemicals, Inc., 0.035 g of dibutyltin dichloride, 1.5 g of an ultraviolet absorber (manufactured by Kyodo Chemical Co., Ltd., trade name: Biosorb 583) and 0.1 g of an internal mold releasing agent (manufactured by Mitsui Chemicals, Inc., trade name: internal mold releasing agent for MR).

After defoaming the thus obtained homogeneous solution under a reduced pressure of 400 Pa for 1 hour, the homogeneous solution was filtered through a PTFE-made 1-μm filter and the resulting filtrate was injected into a mold die composed of a glass mold and a tape. The mold die into which the solution was injected was then placed in a polymerization oven and the solution was allowed to cure by increasing the temperature gradually from 25° C. to 120° C. over a period of 21 hours.

After cooling the mold die to room temperature, the tape and the glass mold were detached from the mold die and the plastic lens formed inside was taken out. Then, in order to remove strain, the plastic lens was heated again at 120° C. for 2 hours and subsequently cooled to room temperature. The thus obtained MR-8™ plastic lens had physical properties that are suitable as a plastic lens for eyeglasses, with a refractive index (ne) of 1.60, an Abbe number (ve) of 40, a specific gravity of 1.29 and a heat resistance of 90° C. or higher.

Next, on the surface of this MR-8™ plastic lens, a hard multicoat (antireflection hard coat) having a sandwich structure in which a layer containing SiO$_2$ as a main component and a layer containing ZrO$_2$ as a main component are sandwiched and the surface layer is the layer containing SiO$_2$ as a main component was laminated to give a MR-8™ plastic lens having an antireflection layer on the surface.

Preparation of Composition

First, to 0.63 g of the CH110831 polymer obtained in Production Example 1 was added 3.52 g of water and the polymer was dissolved by mixing. Then, 218.0 g of EGM (2-methoxyethanol), 1.63 g of TEOS (tetraethoxysilane) and 0.43 g of 5-wt % sulfuric acid were added and the resultant was mixed for 30 minutes. The resulting mixture was passed through a filter having an average pore size of 0.5 μm to give a colorless and transparent coating composition having a solid content of 0.5 wt % (polymer+TEOS (as SiO$_2$)). This composition had a polymer/TEOS (as SiO$_2$) weight ratio of 4/3 (57/43).

Coating of Substrate

On the surface (AR layer) of MR-8™ eyeglass lens having an AR layer (antireflection layer), the coating composition obtained in the above was coated using a spin coater (rotation rate: 4,000 rpm) and heat-cured in an 80° C. oven for 3 hours. After cooling the resulting lens to room temperature, the coated surface was washed with water and then dried in a 40° C. hot-air dryer and the thus formed film was evaluated at room temperature. By observation under an electron microscope (SEM), it was found that a hydrophilic coating film of about 40 to 50 nm was formed on the AR layer.

The thus obtained hydrophilic-coated MR-8™ eyeglass lens was immersed in pure water and irradiated with ultrasonic wave (output: 240 W, frequency: 40 Hz) to evaluate the durability of the hydrophilic film (in the test, the temperature of pure water was controlled at 25° C.)

Figure 5:
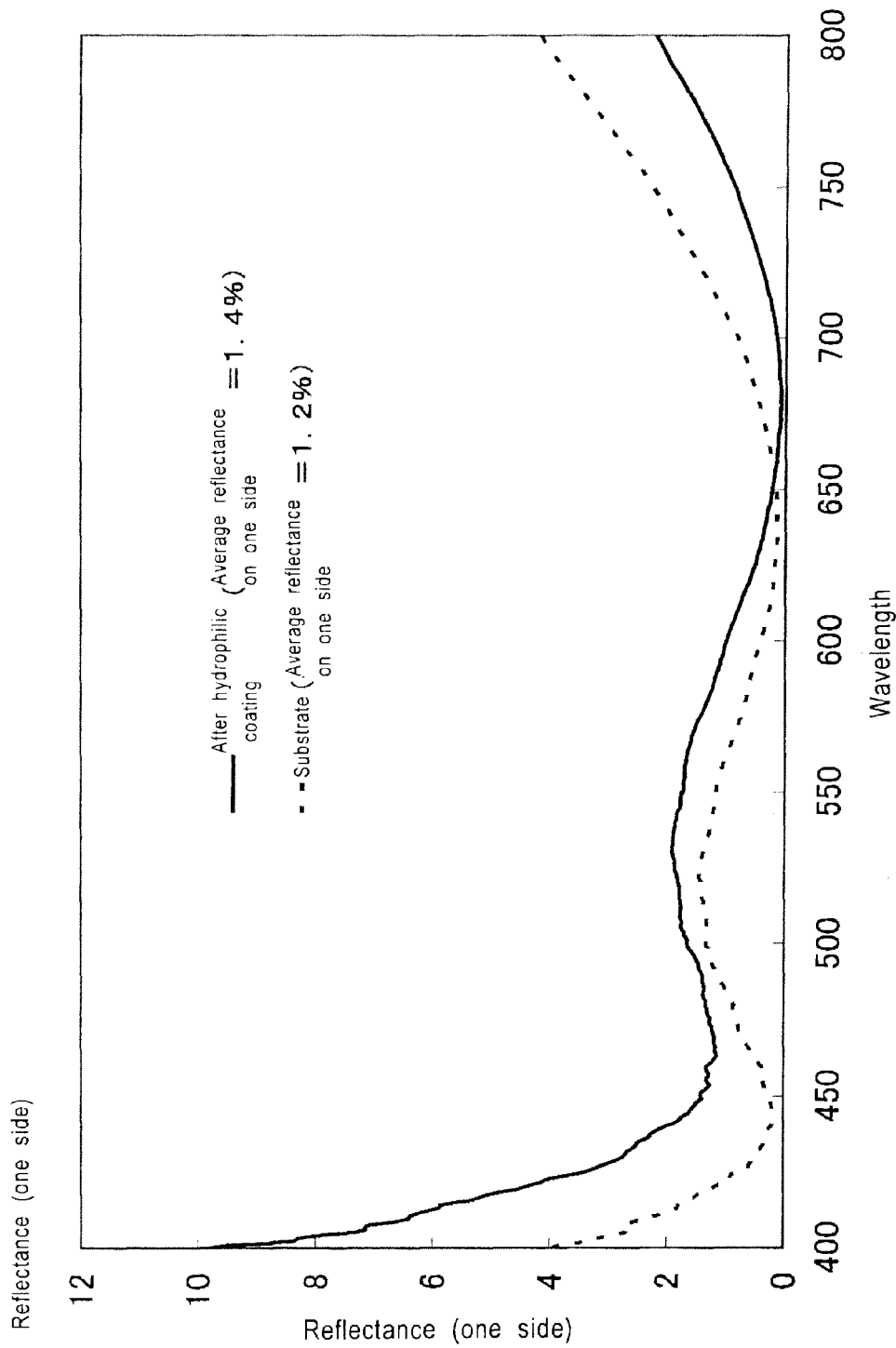
FIG. 5 shows the results of measuring the reflectance of the hydrophilic coating film obtained in Example 23 and that of the substrate used for the hydrophilic coating.

The results are shown in Table 9. Also, the results of measuring the reflectance are shown in FIG. 5.

Comparative Examples 8 to 11

For comparison, a manufacturer-recommended surfactant was coated on an antifogging eyeglass lens that is currently commercially available (an eyeglass lens on which a surfactant recommended and sold by the manufacturer is periodically applied for use) and the resulting lens was evaluated in the same manner as in Example 23.

The results are shown in Table 9.

Comparative Example 12

For comparison, the MR-8™ plastic lens having an antireflection layer on the surface, which was obtained in Production Example 1, was evaluated in the same manner as in Example 23, except that the formation of a coating film using the coating composition was not performed.

The results are shown in Table 9.

TABLE 9

| No. | Product name | *Antireflection Property | Evaluation item | Period of water immersion/ultrasonic treatment | | | | |
|---|---|---|---|---|---|---|---|---|
| | | | | 0 min | 0.2 min | 1 min | 10 min | 30 min |
| Example 23 | Product produced by forming a hydrophilic coating film on a MR-8 ™ plastic lens | ○ | Water contact angle | 3 | 3 | 3 | 3 | 4 |
| | | | Breath-fogging resistance | ○ | ○ | ○ | ○ | ○ |
| | | | Antifouling property | ○ | ○ | ○ | ○ | ○ |
| Comparative Example 8 | FOGGY Guard Coat; manufactured by Tokai Optical Co., Ltd. | | Water contact angle | 25 | 46 | | | |
| | | | Breath-fogging resistance | ○ | x | | | |
| Comparative Example 9 | OPTIFOG Coat; manufactured by Nikon-Essilor Co., Ltd. | | Water contact angle | 4 | 33 | | | |
| | | | Breath-fogging resistance | ○ | x | | | |
| Comparative Example 10 | Crystal Coat; manufactured by Showa Opt. Co., Ltd. | | Water contact angle | 4 | 15 | 20 | | |
| | | | Breath-fogging resistance | ○ | ○ | x | | |
| Comparative Example 11 | FogLess Coat; manufactured by Seiko Optical Products Co., Ltd. | | Water contact angle | 4 | 6 | 17 | 16 | |
| | | | Breath-fogging resistance | ○ | ○ | x | x | |
| Comparative Example 12 | MR-8 ™ plastic lens | ○ | Water contact angle | 20 | | | | |
| | | | Breath-fogging resistance | x | | | | |
| | | | Antifouling property | x | | | | |

*By visual observation, an evaluation "○" was given when reflection of an image was weak and the see-through visibility was good and, an evaluation "x" was given when reflection of an image was strong and the see-through visibility was poor.

Example 24

Coating Test of Organic Substrate

Preparation of Primer Composition

By mixing and dissolving 20.0 g of Takelac A315 manufactured by Mitsui Chemicals, Inc., 175.0 g of a solvent 2-pentanone and 2.5 g of Takenate A10 manufactured by Mitsui Chemicals, Inc., 197.5 g of a primer solution having a NV value of 11 wt % was prepared.

Preparation of Coating Composition

First, to 6.7 g of the CH110901 polymer obtained in Production Example 6 {unit ratio (ATBS-K unit/GMA unit) a/b=86.9/13.1, MW=163,000, Mw/Mn=3.4} was added 40 g of water and the polymer was dissolved by mixing. Then, 50 g of EGM (2-methoxyethanol), 46.7 g of TEOS (tetraethoxysilane) and 9 g of 5-wt % hydrochloric acid were added and the resultant was mixed with stirring at room temperature for 30 minutes. The resulting mixture was passed through a filter having an average pore size of 0.5 μm to give 150 g of a colorless and transparent coating composition having a solid content (NV) of 13 wt %. This composition had a polymer/TEOS (as $SiO_2$) weight ratio of 1/2 (33/67).

Coating of Substrate

The surface of a polycarbonate plate manufactured by Takiron Co., Ltd., was spray-coated with the above-described primer composition and then kept in a 120° C. oven for 10 minutes to cure a primer layer.

On the surface of the thus formed primer layer, the above-described coating composition was coated using a bar coater #50 and pre-dried at 50° C. for 5 minutes. Then, the resulting plate was kept in a 120° C. oven for 1 hour to form a coating film of about 6 μm on the primer layer. After cooling the plate to room temperature, the coated surface was washed with water and the thus formed film was evaluated.

The thus obtained hydrophilic film was transparent and had a water contact angle of 6° and an adhesiveness (cross-cut peeling) of 100/100 as well as excellent breath-fogging resistance and antifouling property.

Example 25

Measurement of Degree of Gradient—1

Preparation of Coating Composition

First, to 6.0 g of the CH110901 polymer obtained in Production Example 6 was added 29.0 g of water and the polymer was dissolved by mixing. Then, 37.0 g of EGM (2-methoxyethanol), 22.0 g of TEOS (tetraethoxysilane) and 6.0 g of 5-wt % sulfuric acid were added and the resultant was mixed with stirring at room temperature for 30 minutes. The resulting mixture was passed through a filter having an average pore size of 0.5 μm to give 99 g of a colorless and transparent coating composition having a NV value of 13 wt %. This composition had a polymer/TEOS (as $SiO_2$) weight ratio of 1/1 (50/50).

Coating of Substrate

On the surface of a thoroughly washed glass plate (water contact angle: <8°), the above-described coating composition was coated using a bar coater #12 and pre-dried at 50° C. for 5 minutes. Then, the resulting glass plate was kept in a 150° C. oven for 1 hour to form a coating film of about 1.5 μm on the glass plate surface. After cooling the glass plate to room temperature, the coated surface was washed with water and the thus formed film was evaluated.

The results are shown in Table 10.

Example 26

Measurement of Degree of Gradient—2

Preparation of Coating Composition

First, to 3.0 g of the CH110901 polymer obtained in Production Example 6 was added 14.5 g of water and the polymer was dissolved by mixing. Then, 68.5 g of EGM (2-methoxyethanol), 11.0 g of TEOS (tetraethoxysilane) and 3.0 g of 5-wt % sulfuric acid were added and the resultant was mixed with stirring at room temperature for 30 minutes. The resulting mixture was passed through a filter having an average pore size of 0.5 μm to give 99 g of a colorless and transparent coating composition having a NV value of 6 wt %. This composition had a polymer/TEOS (as $SiO_2$) weight ratio of 1/1 (50/50).

Coating of Substrate

On the surface of a thoroughly washed glass plate (water contact angle: <8°), the above-described coating composition was coated using a bar coater #24 and pre-dried at 50° C. for 5 minutes. Then, the resulting glass plate was kept in a 150° C. oven for 1 hour to form a coating film of about 1.5 μm on the glass plate surface. After cooling the glass plate to room temperature, the coated surface was washed with water and the thus formed film was evaluated.

The results are shown in Table 10.

Example 27

Measurement of Degree of Gradient—3, on Primer

Preparation of Primer Composition

In the same manner as in Example 24, 100.0 g of a primer solution having a NV value of 2.8 wt % was prepared by mixing and dissolving 2.5 g of Takelac A315 manufactured by Mitsui Chemicals, Inc., 97.2 g of a solvent, 2-pentanone, and 0.3 g of Takenate A10 manufactured by Mitsui Chemicals, Inc.

Preparation of Coating Composition

The coating composition obtained in Example 26 was used.

Coating of Substrate

On the surface of a thoroughly washed glass plate (water contact angle: <8°), the above-described primer composition was coated using a bar coater #2. Then, the resulting glass plate was kept in a 150° C. oven for 10 minutes to form a primer layer of about 0.06 μm on the glass plate surface.

The above-described coating composition was coated on the surface of the thus formed primer layer in the same manner as in Example 26 and the resulting film was evaluated.

The results are shown in Table 10.

TABLE 10

| | Example 25 | Example 26 | Example 27 |
|---|---|---|---|
| Substrate | glass | glass | glass |
| Primer | none | none | added |
| Thickness of primer layer | | | 0.06 μm |
| Polymer | CH110901 | CH110901 | CH110901 |
| Water (solubility parameter σ = 21.4) concentration | 29 wt % | 15 wt % | 15 wt % |
| EGM (solubility parameter σ = 10.8) concentration | 37 wt % | 69 wt % | 69 wt % |
| Polymer/$SiO_2$ weight ratio | 50/50 | 50/50 | 50/50 |
| Coating concentration, NV | 13 wt % | 6 wt % | 6 wt % |
| Thickness of hydrophilic layer | 1.5 μm | 1.5 μm | 1.5 μm |
| Outer appearance | transparent | transparent | transparent |
| Water contact angle | 3.7° | 6.6° | 14.1° |
| *Surface sulfonic acid concentration, Sa | 8.3E+01 | 4.5E+01 | 8.3E+00 |
| **Film internal sulfonic acid concentration, Da | 3.1E+00 | 3.6E+00 | 3.8E+00 |
| Degree of gradient, Sa/Da | 26.8 | 12.5 | 2.2 |

*Sulfonic acid ($SO_3$—) strength in the hydrophilic film surface, which was determined by TOF-SIMS analysis.
**Sulfonic acid ($SO_3$—) strength at the point of ½ film thickness inside the hydrophilic film, which was determined by TOF-SIMS analysis.

Incidentally, when the hydrophilic films of Examples 25 to 27 were subjected to IR analysis, peaks originated from Si—O—Si structure or Si—O—C were detected at 1,040 to 1,060 $cm^{-1}$.

Example 28

UV+Heat-Curing

Preparation of Coating Composition

First, to 6.0 g of the CH110901 polymer obtained in Production Example 6 was added 29.0 g of water and the polymer was dissolved by mixing. Then, 37.0 g of EGM (2-methoxyethanol), 22.0 g of TEOS (tetraethoxysilane) and 6.0 g of 5-wt % sulfuric acid were added and the resultant was mixed with stirring at room temperature for 30 minutes. Further, 1.2 g of a multifunctional acrylate, Denacol acrylate DX-314 (manufactured by Nagase ChemteX Corporation) {10 wt %/(CH110901 polymer+TEOS as $SiO_2$)}, and 0.06 g of a UV polymerization initiator, Darocur 1173 (manufactured by BASF Japan Ltd.), were added and mixed for 5 minutes. The resulting mixture was passed through a filter having an average pore size of 0.5 μm to give 100.0 g of a colorless and transparent coating composition having a NV value of 13 wt %. This composition had a polymer/TEOS (as $SiO_2$) weight ratio of 1/1 (50/50).

Coating of Substrate

On the surface of a thoroughly washed glass plate (water contact angle: <8°), the above-described coating composition was coated using a bar coater #12 and pre-dried at 50° C. for 5 minutes. Then, the resulting glass plate was irradiated with UV (electrode-less discharge lamp H bulb, illumination intensity=800 $mW/cm^2$, cumulative amount of light=390 $mJ/cm^2$) and kept in a 150° C. oven for 1 hour to form a coating film of about 1.5 μm on the glass plate surface. After cooling the glass plate to room temperature, the coated surface was washed with water and the thus formed film was evaluated.

The thus obtained hydrophilic film was transparent and had a water contact angle of 5° and an adhesiveness (cross-cut peeling) of 100/100 as well as excellent breath-fogging resistance and antifouling property.

DESCRIPTION OF SYMBOLS

10: Substrate
20: Coating layer
30: Cutting direction
40: Coating layer surface
50: Inner part of coating layer

The invention claimed is:

1. A composition, comprising:
   a polymer (i) which has a —$SO_3M$ group and an epoxy group, wherein M represents a hydrogen atom, an alkali metal, an alkaline earth metal or an ammonium ion; and
   a tetraalkoxysilane compound (ii),
wherein said polymer (i) is a polymer comprising a structural unit represented by the following Formula (1) and a structural unit represented by the following Formula (2):

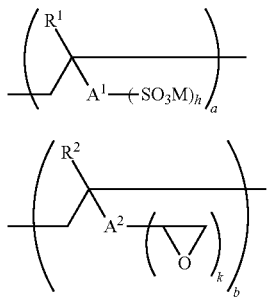

(1)

(2)

wherein, in the Formulae (1) and (2),
$R^1$ and $R^2$ independently represent a hydrogen atom or a methyl group;
M represents a hydrogen atom, an alkali metal, an alkaline earth metal or an ammonium ion;
the unit ratio, a/b, is 99/1 to 50/50;
$A^1$ represents a single bond, —$CH_2$—, —$C_6H_4$—, —$COOCH_2$—, —$COOCH_2CH_2$—, —$COOCH_2CH_2CH_2$—, —$CONH$—$C(CH_3)_2CH_2$—, —$CONH$—$CH(CH_3)$—$CH_2$—, —$CONH$—$CH_2$—, —$CONH$—$CH_2CH_2$— or —$CONH$—$CH_2CH_2CH_2$;
$A^2$ represents a single bond, —$CH_2$—, —$C_6H_4$—, —O—, —$CH_2$—O—, —$CH_2$—O—$CH_2$—, —$C_6H_4$—O—, —$C_6H_4$—O—$CH_2$—, —COO—, —$COOCH_2$—, —$C_6H_4COO$— and or —$C_6H_4$—COO—$CH_2$.

2. The composition according to claim 1, wherein said polymer (i) has a weight-average molecular weight, which is measured by GPC, of 300 to 3,000,000.

3. The composition according to claim 1, wherein the reduced weight ratio of said polymer (i) and said silane compound (ii) is in a range of 99.9/0.1 to 0.1/99.9.

4. A film, obtained by curing the composition according to claim 1.

5. The film according to claim 4, which is formed on a substrate.

6. The film according to claim 5, wherein the ratio (Sa/Da) of the sulfonic acid concentration in the outer surface (Sa) and the sulfonic acid concentration at the midpoint between an interface in contact with said substrate and said outer surface (Da) is 2 to 1,000.

7. The film according to claim 4, which has a surface water contact angle of 30° or smaller.

8. A laminate, produced by laminating the film according to claim 4 on a substrate.

* * * * *